United States Patent
Atkins et al.

(10) Patent No.: US 11,158,032 B2
(45) Date of Patent: Oct. 26, 2021

(54) PERCEPTUALLY PRESERVING SCENE-REFERRED CONTRASTS AND CHROMATICITIES

(71) Applicant: Dolby Laboratories Licensing Corporation, San Francisco, CA (US)

(72) Inventors: Robin Atkins, San Jose, CA (US); David Brooks, Mountain View, CA (US); Jaclyn Anne Pytlarz, Sunnyvale, CA (US); Jon S. McElvain, Manhattan Beach, CA (US); Robert Wanat, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 103 days.

(21) Appl. No.: 16/495,532

(22) PCT Filed: Mar. 19, 2018

(86) PCT No.: PCT/US2018/023171
§ 371 (c)(1),
(2) Date: Sep. 19, 2019

(87) PCT Pub. No.: WO2018/175337
PCT Pub. Date: Sep. 27, 2018

(65) Prior Publication Data
US 2020/0013151 A1 Jan. 9, 2020

Related U.S. Application Data

(60) Provisional application No. 62/473,590, filed on Mar. 20, 2017.

(30) Foreign Application Priority Data

Mar. 20, 2017 (EP) .................... 17161836

(51) Int. Cl.
*G06T 5/00* (2006.01)

(52) U.S. Cl.
CPC .... *G06T 5/009* (2013.01); *G06T 2207/10024* (2013.01)

(58) Field of Classification Search
None
See application file for complete search history.

(56) References Cited

U.S. PATENT DOCUMENTS 7,834,887 B2  11/2010  Xu
8,379,106 B2   2/2013  Koishi
(Continued)

FOREIGN PATENT DOCUMENTS

EP  2887665  6/2015
EP  3035685  6/2016
(Continued)

OTHER PUBLICATIONS

Aydin, T. O. "Extending Quality Metrics to Full Luminance Range Images" Proc. SPIE 6806, Human Vision and Electronic Imaging XIII, Feb. 13, 2008, pp. 68060b-1-11.
(Continued)

*Primary Examiner* — Michelle Chin

(57) ABSTRACT

Input scene images are captured from an original scene. The input scene images may be represented in an input color space. The input scene images are converted into color-space-converted scene images in one of an LMS color space, an ICtCp color space, etc. Scene light levels represented in the color-space-converted scene images are mapped, based at least in part on an optical transfer function, to mapped light levels. A tone mapping is applied to the mapped light levels to generate corresponding display light levels to be represented in display images. The display images may be rendered on a target display.

19 Claims, 22 Drawing Sheets

(56) References Cited

U.S. PATENT DOCUMENTS

| | | | |
|---|---|---|---|
| 8,411,022 B2 | 4/2013 | Brown Elliott | |
| 8,437,053 B2 | 5/2013 | Edge | |
| 8,451,340 B2 | 5/2013 | Tamagawa | |
| 8,477,247 B2 | 7/2013 | Sarkar | |
| 8,531,548 B2 | 9/2013 | Koishi | |
| 9,066,070 B2 | 6/2015 | Su | |
| 9,077,994 B2 | 7/2015 | Miller | |
| 9,288,499 B2 | 3/2016 | Miller | |
| 9,961,237 B2 | 5/2018 | Atkins | |
| 10,140,953 B2 | 11/2018 | Wanat | |
| 10,242,627 B2 | 3/2019 | Farrell | |
| 10,432,977 B2 | 10/2019 | Atkins | |
| 2005/0117799 A1 | 6/2005 | Fuh | |
| 2009/0201309 A1* | 8/2009 | Demos | G01J 3/50 345/589 |
| 2012/0051635 A1* | 3/2012 | Kunkel | G06T 5/009 382/165 |
| 2012/0075435 A1* | 3/2012 | Hovanky | H04N 13/257 348/51 |
| 2014/0029665 A1 | 1/2014 | Damkat | |
| 2014/0063061 A1* | 3/2014 | Reitan | G09G 3/003 345/633 |
| 2014/0066196 A1* | 3/2014 | Crenshaw | A63F 13/10 463/31 |
| 2014/0210847 A1 | 7/2014 | Knibbeler | |
| 2015/0243200 A1 | 8/2015 | Pan | |
| 2015/0248747 A1 | 9/2015 | Atkins | |
| 2015/0256860 A1 | 9/2015 | Kunkel | |
| 2015/0346817 A1* | 12/2015 | Gallo | G09G 5/02 345/619 |
| 2016/0005153 A1 | 1/2016 | Atkins | |
| 2016/0093066 A1 | 3/2016 | Lin | |
| 2016/0100108 A1 | 4/2016 | Pytlarz | |
| 2016/0125580 A1 | 5/2016 | He | |
| 2016/0269733 A1 | 9/2016 | Tourapis | |
| 2020/0296323 A1* | 9/2020 | Endo | H04N 21/4402 |

FOREIGN PATENT DOCUMENTS

| | | |
|---|---|---|
| EP | 2896198 | 11/2016 |
| WO | 2014130343 | 8/2014 |
| WO | 2015128603 | 9/2015 |
| WO | 2016049327 | 3/2016 |
| WO | 2016091406 | 6/2016 |
| WO | 2016118395 | 7/2016 |
| WO | 2016120261 | 8/2016 |
| WO | 2016154336 | 9/2016 |
| WO | 2016172091 | 10/2016 |

OTHER PUBLICATIONS

ITU-R BT.2100-0, "Image Parameter Values for High Dynamic Range Television for Use in Production and International Programme Exchange" Jul. 2016.

Mantiuk, R. et al "Lossy Compression of High Dynamic Range Images and Video" Proc. SPIE 6057, Human Vision and Electronic Imaging XI, pp. 1-10.

Nezambadi, M. "Color Signal Encoding for High Dynamic Range and Wide Color Gamut Based on Human Perception" SPIE Electronic Imaging, Feb. 1, 2014, San Francisco, CA, pp. 1-15.

Pytlarz, J.A. et al "Real Time Cross-Mapping of High Dynamic Range Images" IBC 2016 Conference, pp. 1-10, Sep. 12, 2016.

SMPTE 2084:2014 "High Dynamic Range Electro-Optical Transfer Function of Mastering Reference Displays".

Stessen, J. "Chromaticity Based Color Signals for Wide Color Gamut and High Dynamic Range" ISO/IEC JTC1/SC29/WG11 MPEG 2014, Oct. 2014, Strasbourg, France.

\* cited by examiner convert a scene pixel values to L, M and S scene pixel values 412 derive a scene light level based on the L, M and S scene pixel values 414 map, based on an OTF, the scene light level to a mapped light level 416 apply a common ratio to each of the L, M and S scene pixel values 418 cause a display image to be rendered on a target display with display pixel values derived from the mapped L, M and S scene pixel values 420

FIG. 4B convert a scene pixel values to I, T and P scene pixel values 422 map, based on an OTF, an I scene pixel value to a mapped I pixel value 424 cause a display image to be rendered on a target display with display pixel values derived from the mapped I pixel values and unmapped T and P scene pixel values 426

FIG. 4C

PERCEPTUALLY PRESERVING SCENE-REFERRED CONTRASTS AND CHROMATICITIES

CROSS REFERENCE TO RELATED APPLICATIONS

The present application claims benefit of and claims priority to U.S. Provisional Application No. 62/473,590 and European Patent Application No. 17161836.6, both filed on Mar. 20, 2017, the disclosures of which are incorporated herein by reference in their entirety.

TECHNOLOGY

The present invention relates generally to images. More particularly, an embodiment of the present invention relates to perceptually preserving scene-referred contrasts and chromaticities.

BACKGROUND

Camera sensors capture light levels from a scene. These light levels might be displayed directly on a display device if the display device would have the same brightness capabilities as the original scene. However, the original scene can often contain brightness levels that far exceed the capabilities of the display device. In addition, display devices are often viewed in relatively dim display viewing environments that are very different from the original scene.

Image processing operations used to transform scene images from the original scene to display images rendered on display devices of various display capabilities may not preserve contrasts and chromaticities of the scene images of the original scene in the display images. For example, in terms of human visual perception, the display images as rendered on these display devices may appear different in contrasts and chromaticity from what a viewer views, or a camera captures from, the original scene in situ.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A through FIG. 4E illustrate example process flows; and

DESCRIPTION OF EXAMPLE EMBODIMENTS

Figure 1A:
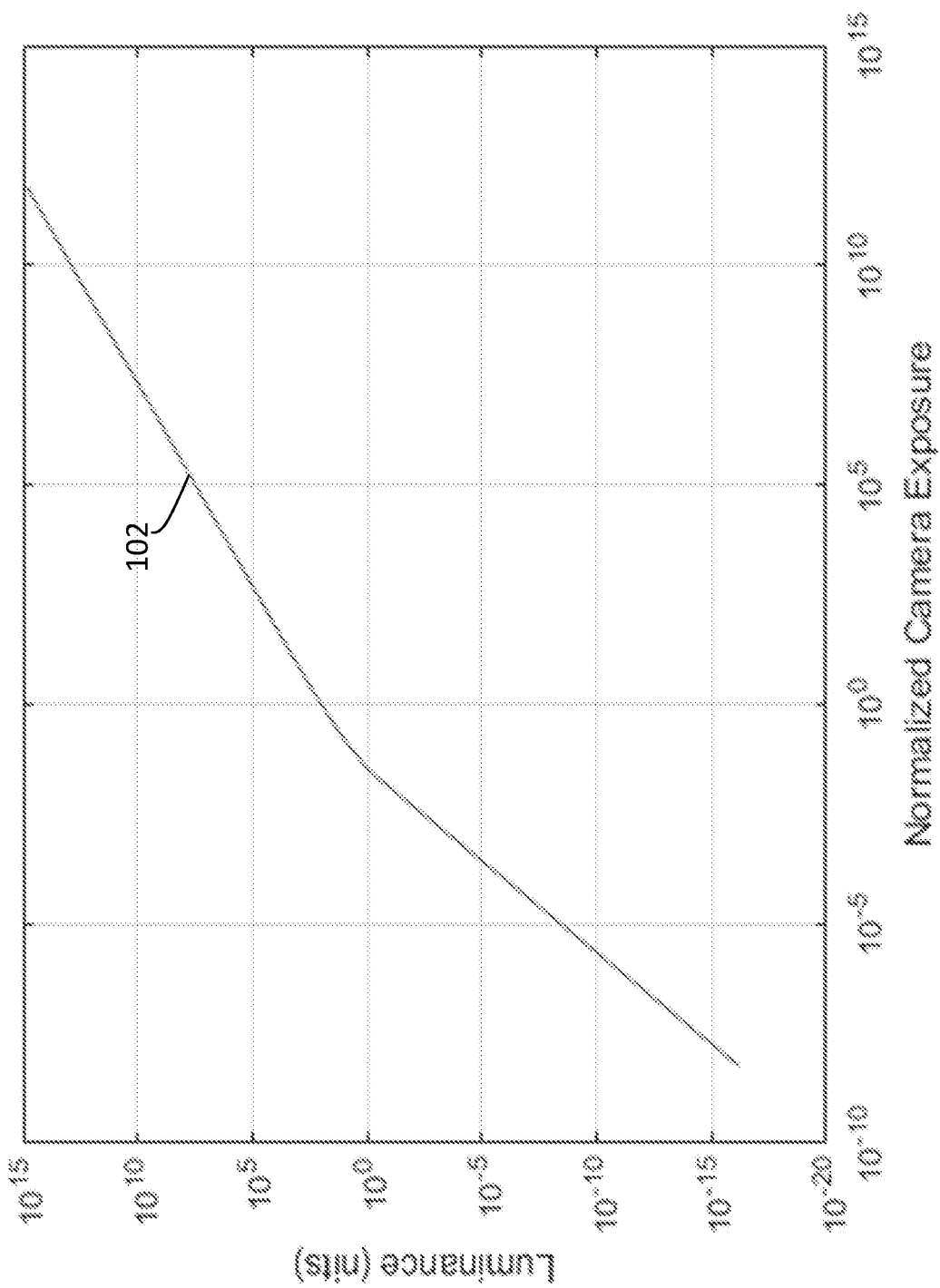
FIG. 1A and FIG. 1F illustrate example optical-to-optical transfer functions (OOTFs)

Example embodiments, which relate to perceptually preserving some or all of scene-referred contrasts and chromaticities, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. OPTICAL-TO-OPTICAL TRANSFER FUNCTION
3. SATURATION/HUE SHIFTS
4. CHROMATICITY/HUE PRESERVATION
5. ABSOLUTE LIGHT LEVELS AND CHROMATICITY/HUE PRESERVATION
6. SCENE VIEWING ENVIRONMENTS
7. ADAPTING OOTF BY INTERPOLATION
8. SELECTING OPTIMAL OOTF
9. PERFORMING OOTF BY WAY OF DISPLAY MANAGEMENT
10. PERFORMING OOTF IN ADDITION TO DISPLAY MANAGEMENT
11. EXAMPLE PROCESS FLOWS
12. IMPLEMENTATION MECHANISMS—HARDWARE OVERVIEW
13. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Scene images may be acquired/captured/composited from an original scene by any combination of a wide variety of capture devices, which may be present at the original (e.g., physical) scene, which may implement a visual object model giving rise to the original (e.g., virtual) scene, etc. Example capture devices include, but are not limited to, HDR cameras, mobile phone cameras, cameras that are integrated with computing devices, cameras that operate in conjunction with computing devices, non-professional cameras, professional cameras, virtual cameras, computer image generators, computer image renderers, computer graphics generators, computer animators, virtual image generators, etc. It should be noted that the original scene as described herein may be entirely a physical scene, entirely a virtual scene, or a combination of one or more physical scenes and/or one or more virtual scenes. For example, a scene image is not necessarily limited to be only a two-dimensional (2D) image but may also be a three-dimensional (3D) virtual reality image, etc. In some embodiments, a scene image may also be defined as an image projected on a specific display under specific viewing conditions (e.g., in a dark room).

The visual appearance of the original scene to a viewer in situ at the original scene, as captured by the scene images, may be referred to as scene-referred visual appearance. The visual appearance of display images derived/transformed from the scene images, as rendered on display devices, may be referred to as display-referred visual appearance.

As used herein, the term "visual appearance" refers to a combination of visually perceivable contrasts and visually perceivable chromaticities (hues and saturations); or refers to a combination of visually perceivable contrasts and visually perceivable hues.

Techniques as described herein can be applied to ensure that the display-referred visual appearance of the original scene faithfully (e.g., perfectly, perceptually, below human noticeable thresholds, within a relatively small error, etc.) reproduces the scene-referred visual appearance of the original scene. It should be noted that in some embodiments, the scene-referred visual appearance of the original scene may refer to a visually appearance of the original scene with specific camera settings and specific camera image signal processing (camera ISP) selected with intent to generate pleasing scene images from the original scene.

The display images generated and optionally rendered under techniques as described herein allow viewers (e.g., humans, etc.) to perceive the same visual appearance as that of the original scene. The viewers can see from the display images what a viewer (or a virtual viewer) would see in situ at the original scene, in terms of the scene-referred visual appearance of the original scene.

The techniques as described herein can be further used to reduce the amount of video data needed to carry the display images, while fully exploiting specific display capabilities of specific display devices (e.g. displays with high dynamic range and/or wide color gamut, etc.) for the purpose of conveying the scene-referred visual appearance of the original scene to viewers.

Example embodiments described herein relate to perceptually preserving some or all of scene-referred contrasts and chromaticities. One or more input scene images are captured from an original scene, the one or more input scene images being represented in an input color space. The one or more input scene images are converted into one or more color-space-converted scene images in one of an LMS color space or an ICtCp color space. Based at least in part on an optical transfer function, scene light levels represented in the one or more color-space-converted scene images in the one of the LMS color space or the ICtCp color space are mapped to mapped light levels. A tone mapping is applied to the mapped light levels to generate corresponding display light levels to be represented in one or more display images. Optionally, the one or more display images are caused to be rendered on a target display.

In some example embodiments, a set of scene pixel values for a scene pixel in a scene image captured from an original scene is converted into a set of L, M and S scene pixel values represented in an LMS color space for the scene pixel, the set of scene pixel values being represented in an input color space. A scene light level for the scene pixel is derived based on the set of L, M and S scene pixel values for the scene pixel. Based at least in part on an optical transfer function, the scene light level is mapped to a mapped light level of the scene pixel. A common ratio is applied to each of the L, M and S scene pixel values in the set of L, M and S scene pixel values for the scene pixel to generate a set of mapped L, M and S scene pixel values for the scene pixel, the common ratio being computed from the scene light level and the mapped light level. Optionally, a display image is caused to be rendered on a target display, the display image including a display pixel for which a set of display pixel values is derived from the set of mapped L, M and S scene pixel values.

In some example embodiments, a set of scene pixel values for a scene pixel in a scene image captured from an original scene is converted into a set of I, T and P scene pixel values represented in an ICtCp color space for the scene pixel, the set of scene pixel values being represented in an input color space. Based at least in part on an optical transfer function, an I scene pixel value in the set of I, T and P scene pixel values is mapped to a mapped I scene pixel value. Optionally, a display image is caused to be rendered on a target display, the display image including a display pixel for which a set of display pixel values includes the mapped I scene pixel value. Optionally, the set of display pixel values of the display pixel further includes T and P scene pixel values in the set of I, T and P scene pixel values for the scene pixel.

The input signal of the two previous example embodiments is a set of scene pixel values for a scene pixel in a scene image captured from an original scene. In an example, the set of scene pixel values corresponds to a raw camera signal, e.g. a scene-referred signal captured by a camera. Said scene-referred signal may be a signal to which no optical transfer function has been applied, e.g. no OOTF has been applied.

In some example embodiments, a scene environment light level is generated to represent a scene viewing environment of an original scene from which one or more scene images are captured. A range of scene light levels represented in the one or more scene images of the original scene is generated. It is determined whether the scene environment light level is the same as a display environment light level that represents a display viewing environment of a target display. It is also determined whether the range of scene light levels is within a supported range of display light levels supported by the target display. In response to determining that the scene environment light level is same as a display environment light level that represents a display viewing environment of a target display and that the range of scene light levels is within a supported range of display light levels supported by the target display, one or more display images comprising display light levels that are identical to corresponding scene light levels in the one or more scene images are generated. Optionally, the one or more display images are caused to be rendered on the target display.

In some example embodiments, a scene environment light level is generated to represent a scene viewing environment of an original scene from which one or more scene images are captured. A range of scene light levels represented in the one or more scene images of the original scene is generated. A tone mapping is applied to scene pixel values in the one or more scene images of the original scene to generate corresponding display pixel values in one or more display images. Optionally, the one or more display images are caused to be rendered on the target display.

In some example embodiments, mechanisms as described herein form a part of a media processing system, including but not limited to any of: non-digital camera, digital camera, light field camera, CCD camera, camera on a mobile device, camera with a computing device, image capturing device, image acquisition device, camera system with multiple camera elements, camera mounted with a user, camera in a wearable device, camera in a game system, virtual camera (e.g., any combination of virtual zoomable and/or non-zoomable lenses, virtual shutters, virtual irises, etc.), computer graphics generation system, image source device (e.g., in a virtual reality system, in an augmented reality system, in a remote presence system, etc.), cloud-based server, mobile device, encoding device, transcoding device, decoding device, media device, CAVE-type system or wall-sized display, video game device, display device, media player, media server, media production system, camera systems, home-based systems, communication devices, video processing system, video codec system, studio system, streaming server, content service system, handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. OPTICAL-TO-OPTICAL TRANSFER FUNCTION

An optical-optical transfer function (OOTF) as described herein may be applied to convert scene light levels (or scene relative exposure levels) of an original scene, as represented in scene images captured from the original scene, to mapped light levels. The mapped light levels can be used to represent, or further mapped to generate, display light levels in display images to be rendered by one or more display devices. Example OOTFs can be found in Recommendation ITU-R BT.2100-0 (July 2016) or later (hereinafter referred to as "ITU-R. BT.2100"), which is incorporated herein by reference in its entirety.

The OOTF as described herein may be implemented in one or more image processing operations performed by an image processing pipeline. Example image processing pipelines may include, but are not necessarily limited to only, any of: capture-device-implemented image processing pipelines, broadcast image processing pipelines, virtual reality (VR) image processing pipelines, augmented reality (AR) image processing pipelines, remote presence image processing pipelines, teleconference image processing pipelines, telemedicine image processing pipelines, in automobile entertainment image processing pipelines, etc.

An original scene as described herein may refer to any combination, any composition, any superposition, etc., of: one or more real-world scenes, one or more virtual-world scenes, etc. A real-world scene may be captured in scene images by one or more cameras with light sensors (and other physical components such as lenses, shutters, irises, etc.) present in a real-world environment from physical lights emitted or reflected off from real-world light emitters, real-world human figures, real-world objects, real-world backgrounds, etc. The real-world (or physical) environment may exist in a movie studio, in the field, etc. A virtual-world scene may be captured in scene images by one or more virtual cameras (with virtual components such as virtual lenses, virtual shutters, virtual irises, etc.) virtually present in a virtual environment from virtual lights emitted or reflected off (through computer-based modeling or rendering) from virtual-world light emitters, virtual-world human figures, virtual-world objects, virtual-world backgrounds, etc. The virtual environment may be specified/defined based on a computer model that comprises the virtual cameras, the virtual-world light emitters, the virtual-world human figures, the virtual-world objects, the virtual-world backgrounds, etc.

FIG. 1A illustrates an example OOTF 102 that maps relative scene light levels (denoted as "Normalized Camera Exposure") captured with a normalized camera exposure setting to mapped light levels (denoted as "Luminance", which may be represented in absolute light levels, in candelas per meter squared (or nits), as luma values, etc., in some embodiments). In some embodiments, the scene light levels to be mapped by the OOTF (102) are relative light levels acquired/captured with a (e.g., normalized, default, specific, etc.) camera exposure setting. Whereas the scene light levels represent light levels of an original scene, the mapped light levels generated by the OOTF (102) represent light levels to be rendered by a (e.g., reference, default, specific, etc.) display device, which may be in a (e.g., reference, default, specific, etc.) display viewing environment (e.g., with a display environment light level of 5 nits, with a background luminance of 5 nits, etc.).

In some embodiments, as illustrated in FIG. 1A, the OOTF (102) maps a relative scene light level of a numeric value 1.0 to an absolute mapped light level of 100 nits. It should be noted that, in other embodiments, the OOTF (102) may map a relative scene light level of a numeric value 1.0 to an absolute mapped light level of a value other than 100 nits.

The OOTF (102) may be specified based on one or more of: standards (e.g., based on ITU-R. BT.2100, etc.), non-standard specifications (e.g., based on a proprietary specification, etc.), etc. The OOTF (102) may be used for one or more of: a wide variety of broadcast display applications, non-broadcast display applications, display applications such as VR applications, AR applications, remote presence applications, automobile entertainment applications, telemedicine applications, etc. In some embodiments, the OOTF (102) is specifically defined to be suitable or optimized for a specific type of display application such as broadcast display applications. Additionally, optionally or alternatively, the OOTF (102) or a different OOTF can be specifically defined to be suitable or optimized for one or more other non-broadcast display applications.

The OOTF (102) may for example correspond to the reference PQ OOTF specified in the ITU-R BT.2100 standard (cf. Table 4 of ITU-R BT.2100). This reference PQ OOTF is specified as:

$$F_D = \text{OOTF}[E] = G_{1886}[G_{709}[E]].$$

Herein, $F_D$ is the luminance of a display linear component $(R_D, G_D, B_D; Y_D;$ or $I_D)$, and $E = \{R_S, G_S, B_S; Y_S;$ or $I_S\}$ is the signal determined by scene light and scaled by camera exposure. The values $E, R_S, G_S, B_S, Y_S, I_S$ are usually in the range [0:1]. However, depending on the exposure range of the camera, it may be desirable to output a smaller luminance range than can be represented by PQ. This may be achieved by scaling the raw [0:1] linear exposure range of the camera to a more limited range before applying the OOTF.

Defining $E'=G_{709}[E]$ as a non-linear representation of E, one can write: $F_D=G_{1886}[G_{709}[E]]=G_{1886}[E']$. The expressions for $G_{709}[E]$ and $G_{1886}[E']$ are given in BT. 2100 as:

$$E' = G_{709}[E] = \begin{cases} 1.099(59.5208E)^{0.45} - 0.099 & \text{for } 1 > E > 0.0003024 \\ 267.84E & \text{for } 0.0003024 \geq E \geq 0 \end{cases}$$

$$F_D = G_{1886}[E'] = 100E'^{2.4}$$

3. SATURATION/HUE SHIFTS

The OOTF (102) may be selected and used as a starting point for converting scene light levels to mapped light levels. However, a simplistic application of the OOTF(102) directly to scene pixel values is likely to introduce saturation/hue shifts in mapped images comprising corresponding mapped pixel values converted by the OOTF(102) from the scene pixel values.

For the purpose of illustration, the OOTF (102) may be applied to map scene pixel values (or scene color space components) in an input RGB color space to mapped pixel values (or mapped color space components) in an output RGB color space, as shown in the following expressions:

$$R'=\text{OOTF}(R) \qquad (1\text{-}1)$$

$$G'=\text{OOTF}(G) \qquad (1\text{-}2)$$

$$B'=\text{OOTF}(B) \qquad (1\text{-}3)$$

where R, G and B denote the scene pixel values in the red (R) component, the green (G) component and the blue (B) component, respectively, of the input RGB color space; R', G' and B' denote the mapped pixel values in the red (R) component, the green (G) component and the blue (B) component, respectively, of the output RGB color space.

In some embodiments, the input RGB color space is a native camera RGB color space, whereas the output RGB color space is an RGB color space based on BT.2020 primaries, an RGB color space based on LMS primaries as defined in BT.2100, etc.

Applying the OOTF (102) to map the scene pixel values in the input RGB color space to the mapped pixel values in the output RGB color space increases contrasts (e.g., tonal contrasts, local contrasts in grayscale levels, etc.) in the mapped pixel values in the output RGB color space as intended, but also introduces chromaticity changes such as saturation shifts (e.g., saturation increase, etc.) and hue shifts in mapped images comprising the mapped pixel values in the output RGB color space.

Figure 2A:
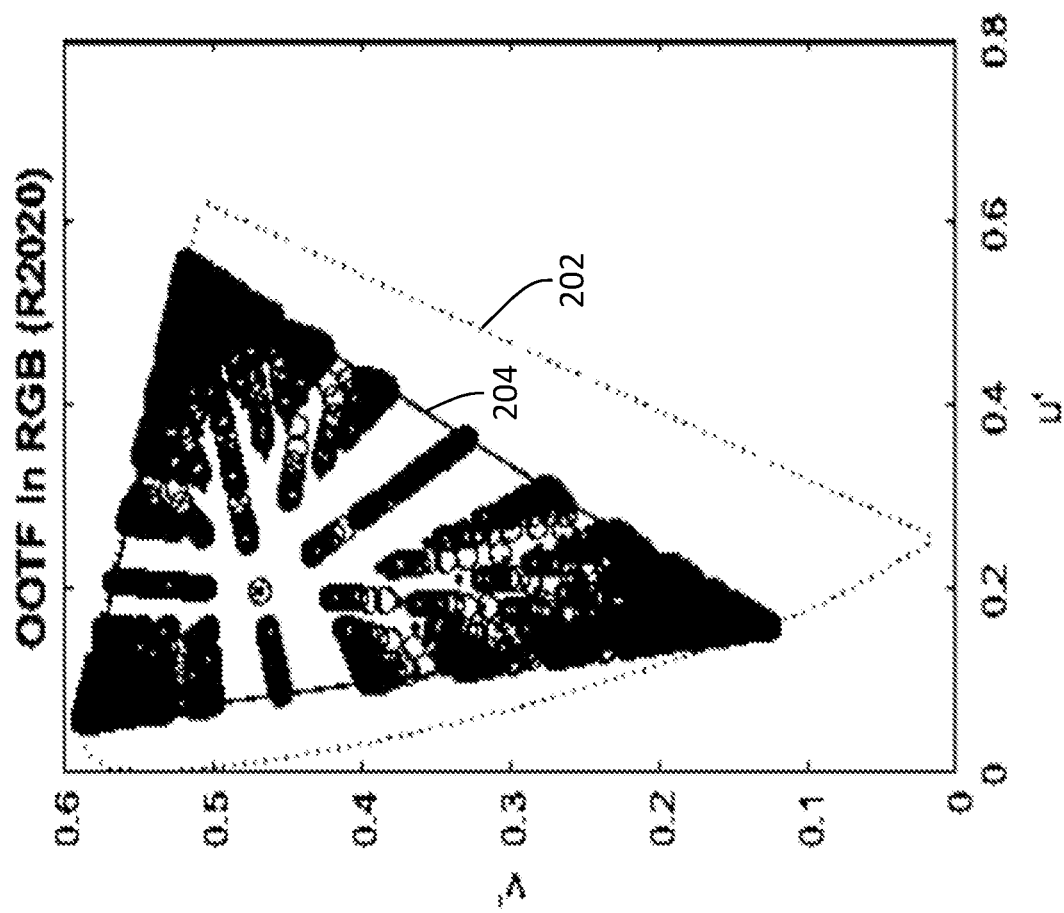
FIG. 2A through FIG. 2D illustrate example chromaticity distributions of mapped pixel values.

FIG. 2A illustrates an example chromaticity distribution of mapped pixel values (R'G'B') in the output RGB color space as mapped from the scene pixel values (RGB) in the input RGB color space when the OOTF (102) is applied to the scene pixel values (RGB). Chromaticities perceivable by the human vision system are represented by a horseshoe shape 202, whereas a color gamut comprising chromaticities supported by a display device (e.g., a reference display, a display as specified by a standard, a display as specified by a proprietary specification, etc.) is represented by a triangle 204 within the horseshoe shape (202).

In the present example, for many scene colors represented by different combinations of scene pixel values, saturations are increased and hues are shifted in mapped colors represented by corresponding combinations of mapped pixel values to which the scene pixel values are mapped by the OOTF (102). As used herein, scene colors refer to either scene chromaticities or a combination of scene light levels and scene chromaticities, whereas mapped colors refers to either mapped chromaticities or a combination of mapped light levels and mapped chromaticities. As used herein, the term "chromaticity" may refer to both hue and saturation as represented by individual pixel(s).

Under other approaches that do not implement the techniques as described herein, an OOTF may also be applied to map scene pixel values (or scene color space components) in a non-RGB color space.

For the purpose of illustration, the OOTF (102) is applied to a first (e.g., input, intermediate, etc.) LMS color space to mapped pixel values (or mapped color space components) in a second (e.g., output, intermediate, etc.) LMS color space, as shown in the following expressions:

$$L'=\text{OOTF}(L) \qquad (2\text{-}1)$$

$$M'=\text{OOTF}(M) \qquad (2\text{-}2)$$

$$S'=\text{OOTF}(S) \qquad (2\text{-}3)$$

where L, M and S denote the scene pixel values in the L component, the M component and the S component, respectively, of the first LMS color space; L', M' and S' denote the mapped pixel values in the L component, the M component and the S component, respectively, of the second LMS color space.

Figure 2B:
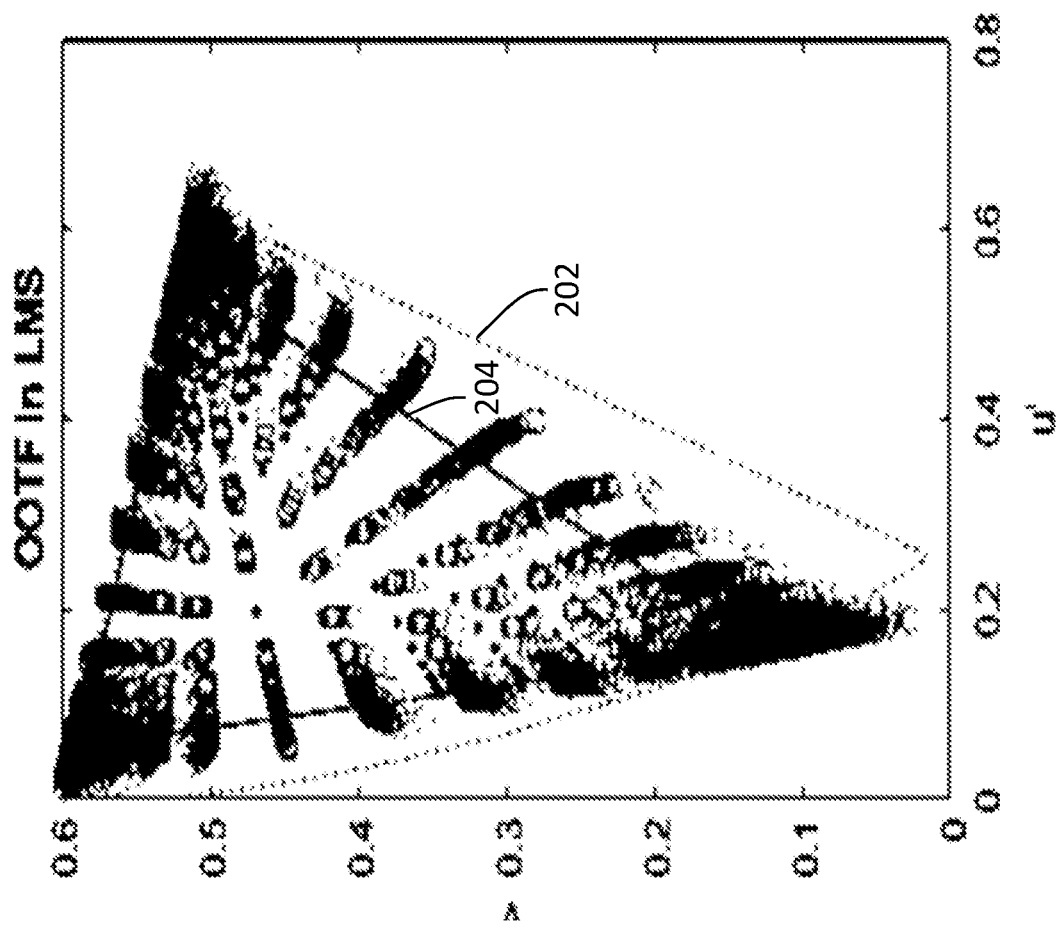

FIG. 2B illustrates an example chromaticity distribution of mapped pixel values (L'M'S') as mapped from the scene pixel values (LMS) when the OOTF (102) is applied to the scene pixel values (LMS). As shown, applying the OOTF (102) in the LMS color space(s) reduces hue shifts in mapped colors as represented by the mapped pixel values in reference to scene colors as represented by the scene pixel values, but also increases saturations in the mapped colors well beyond an original color gamut, and even beyond what can be represented in a video signal format. Thus, further color remapping may be needed after applying the OOTF (102) in the LMS space(s).

4. CHROMATICITY/HUE PRESERVATION

Techniques as described herein can be used to implement methods of applying OOTFs that prevent or significantly lessen the chromaticity/hue shifts that would be generated by other approaches that do not implement these techniques.

Under the techniques as described herein, an OOTF (e.g., 102 of FIG. 1A, etc.) may be applied to transform scene light levels to mapped light levels in a variety of color space(s) such as ICtCp color space(s), LMS color space(s), and the like.

In some embodiments, scene pixel values in an input RGB color space can be converted first into scene pixel values in an (e.g., intermediate, etc.) XYZ color space (e.g., the CIE XYZ color space, etc.). The scene pixel values in the XYZ color space can then be converted into scene pixel values in an (e.g., intermediate, etc.) LMS color space that comprises an L component, an M component or an S component to represent tristimulus values linked to three different types of visual sensors in the human vision system.

Example RGB, XYZ, LMS and ICtCp color spaces and conversions among these color spaces can be found in PCT Application PCT/US2016/045362, filed on Aug. 3, 2016, which is incorporated herein by reference in its entirety.

In some embodiments, the scene pixel values in the LMS color space are linear LMS pixel values. For a given scene pixel comprising a set of linear scene pixel values respectively in the L, M and S components of the LMS color space, the OOTF (102) is applied to map a scene light level (or a scene linear intensity value denoted as I) of the scene pixel as derived from the linear scene pixel values (e.g., L, M, etc.) of the scene pixel to a mapped light level (or a mapped linear intensity value OOTF(I)). A ratio of the mapped light level (OOTF(I)) over the scene light level (I) is then applied to scale the linear scene pixel values, as shown in the following expressions:

$$I = L/2 + M/2 \quad (3)$$

$$L' = L*OOTF(I)/I \quad (4\text{-}1)$$

$$M' = M*OOTF(I)/I \quad (4\text{-}2)$$

$$S' = S*OOTF(I)/I \quad (4\text{-}3)$$

where L', M' and S' denote mapped pixel values respectively in the L, M and S components of the LMS color space as converted under this example method of applying OOTF(s), e.g. the reference PQ OOTF specified in ITU-R BT.2100. For the purpose of illustration only, light levels may be computed from one half of L and one half of M. It should be noted that in other embodiments, light levels may be computed based on different numeric factors applied to L, M and S. In addition, it has been described that techniques (e.g., expressions (3) and (4) above, etc.) as described herein can be used to convert pixel values with OOTF(s). In other embodiments, techniques as described herein can be similarly used to convert pixel values with other transfer functions including but not necessarily limited to opto-electric transfer function(s) (OETF(s)), inverse electric-to-optical transfer function(s) (inverse EOTF(s)), etc.—for example using an OETF or an inverse EOTF in expressions (3) and (4) above instead of the OOTF. Thus, while example embodiments herein are described in terms of the OOTF function, based on inter-relationship between the OETF, EOTF, and OOTF non-linear optical transfer functions, these methods may be adopted to embodiments based on either the EOTF or the OETF functions.

Figure 2C:
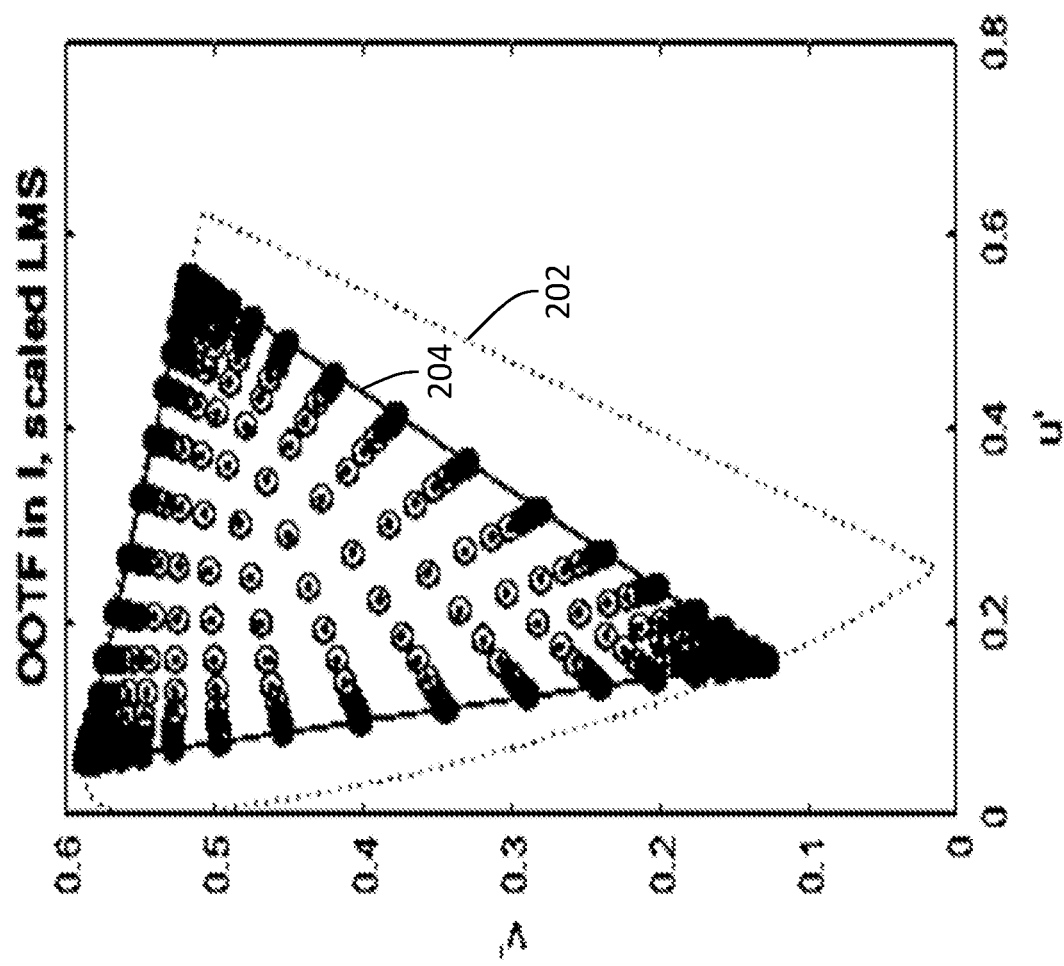

FIG. 2C illustrates an example chromaticity distribution of mapped pixel values (L'M'S') as mapped from scene pixel values (LMS) when the OOTF (102) is applied to the scene pixel values in the LMS color space with expressions (3) and (4) above.

This method of applying the OOTF (102) under techniques as described herein (e.g., perfectly, comparatively, substantially, etc.) preserves chromaticities/hues represented by scene pixel values as captured from an original scene in mapped pixel values in mapped images to be rendered in terms of tristimulus values linked to three different types of visual sensors in the human vision system.

It should be noted that this method (e.g., as illustrated with expressions (3) and (4), etc.) can be applied to scene pixel values that represent linear values, non-linear values, PQ values, non-PQ values, gamma based values, relative light levels, absolute light levels, etc.

5. ABSOLUTE LIGHT LEVELS AND CHROMATICITY/HUE PRESERVATION

Scene images as described herein as captured from an original scene are generated with specific (virtual or real) camera exposure settings. These settings may be automatically or manually selected/adjusted in a (virtual or real) camera system to obtain pleasing looks, artistic effects, etc., in the scene images captured from the original scene.

The scene images may comprise scene light levels represented as relative values. These relative values may be regarded as normalized/scaled values from absolute (or actual) light levels based on a normalization/scaling factor related to the specific camera exposure settings used to capture the scene images.

For example, the scene images may comprise scene pixel values in the RGB components of an input RGB color space that are relative values of scene light levels in the R, G and B colors. A scene pixel in a scene image may comprise the following scene pixel values in the RGB color space: a red (R) value, a green (G) value and a blue (B) value. These RGB values may indicate a relative light level in the red color, a relative light level in the green color and a relative light level in the blue color, which may have been respectively normalized/scaled from an absolute light level in the red color, an absolute light level in the green color and an absolute light level in the blue color. The scaling/normalization from the absolute light levels in the red, green and blue colors to the relative values in the red, green and blue colors may be performed using one or more of: a scaling/normalization factor, a multiplicative factor, a function, a table, etc., which may be set or determined based on a default or specific camera exposure setting used to the source image.

In some embodiments, a relative value 1.0 in each scene pixel value of a scene pixel in a scene image represents an absolute light level 100 nits, which would imply a linear OOTF with a slope of 100 nits. For example, a relative value 1.0 in each value of RGB values (R=1.0, G=1.0 and B=1.0) of a scene pixel in the scene image may represent an absolute light level 100 nits. It should be understood which absolute light level relative values of a scene pixel in a scene image maps to may depend on a normalization/scaling factor related to a specific camera exposure setting used for capturing the scene image from an original scene. In some other embodiments, relative values (R=1.0, G=1.0 and B=1.0) of a scene pixel in a scene image may represent an absolute light level other than 100 nits (e.g., 50 nits, 150 nits, etc.) depending on another normalization/scaling factor.

Under a second example method of applying OOTF(s) involving absolute light levels, the first step is to inversely normalize/scale relative scene pixel values (representing relative light levels) in a scene image by a normalization/scaling factor (e.g., 100 as illustrated in expression (5)) to generate absolute scene pixel values (representing absolute light levels). This normalization/scaling factor may be applied to map relative scene pixel values 1.0 represented in an LMS color space to an absolute light level 100 nits, thereby generating absolute scene pixel values in the LMS color space.

These absolute scene pixel values may be further converted to perceptually quantized (PQ) codewords in the LMS color space using the L2PQ conversion function (e.g., a PQ mapping, etc.), followed by a conversion operation from the PQ codewords in the LMS color space to corresponding PQ codewords in the ICtCp color space using the conversion matrix LMS2ITPmat, as shown in the following expression:

$$ITP = L2PQ(LMS*\beta)*LMStoITPmat \quad (5)$$

where β denotes the normalization/scaling factor as discussed above; I, T and P denote the PQ codewords (in the ICtCp color space) in the I, T and P color space components, respectively; LMStoITPmat represents a (e.g., 3×3) conversion matrix that can be used to from pixel values represented in the LMS color space to corresponding pixel values in the ICtCp color space; L2PQ represents a linear-to-PQ conversion function (e.g., a PQ mapping, etc.) that converts linear pixel values to PQ pixel values.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus, among other factors. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

An example of an EOTF based on a PQ curve is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

The second step of this example second method is to apply the OOTF (102) to PQ codewords in the I (color space) component of the ICtCp color space. Since the OOTF (102) expects linear values as input, the PQ codewords in the I component of the ICtCp color space may be first converted to corresponding linear scene pixel values (representing absolute light levels) in the I component of the ICtCp color space using the conversion function PQ2L (e.g., a PQ-to-linear conversion function, an inverse PQ mapping, etc.). As the OOTF (102) may expect input values to be relative values (or normalized/scaled scene pixel values representing relative light levels), these linear scene pixel values in the I component of the ICtCp color space may be scaled back (e.g., inversely, etc.) to relative linear values in the I component of the ICtCp color space. The relative linear values in the I component of the ICtCp color space are then applied with the OOTF (102) to generate display relative linear values in the I component of the ICtCp color space, followed by a conversion that converts the display relative linear values in the I component of the ICtCp color space to display PQ codewords in the I component of the ICtCp color space using the conversion function L2PQ, as shown in the following expressions:

$$I'=L2PQ(\text{OOTF}(PQ2L(I)/\beta)) \quad (6)$$

where I' denotes the display PQ codewords in the I component in the ICtCp color space; L2PQ represents a linear-to-PQ conversion function that converts linear pixel values to perceptually quantized (PQ) pixel values. It has been described that techniques (e.g., expression (6) above, etc.) as described herein can be used to convert pixel values with OOTF(s), e.g. the reference PQ OOTF specified in ITU-R BT.2100. In other embodiments, techniques as described herein can be similarly used to convert pixel values with other transfer functions including but not necessarily limited to OETF(s), etc.—for example using OETF in expression (6) above instead of the OOTF.

It should be noted that the foregoing steps are separately discussed for illustrative purposes only. In some implementations, some or all of the foregoing steps as represented by or within expressions (5) and (6) may be combined/concatenated into a single lookup table (e.g., a 1D lookup table, a multi-dimensional lookup table etc.) or a single function.

Figure 2D:
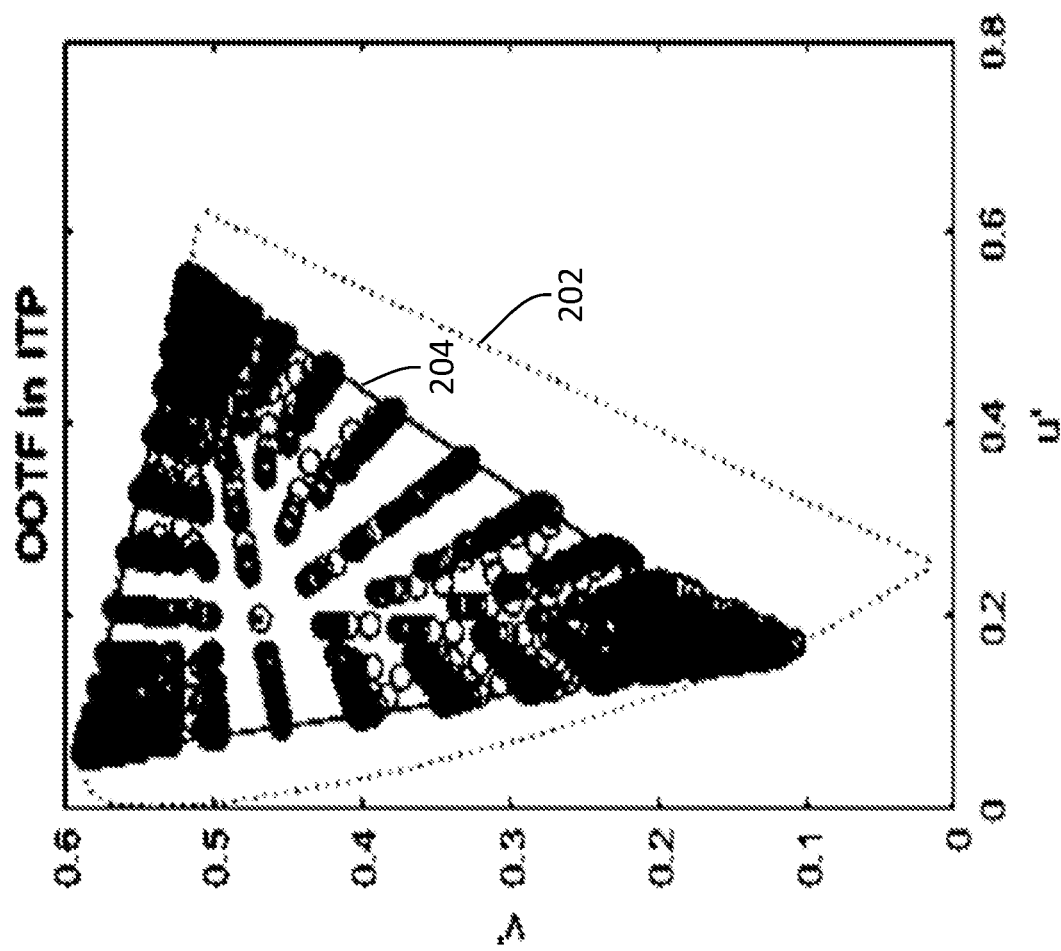

FIG. 2D illustrates an example chromaticity distribution of mapped colors (I', P, T) as mapped from scene colors (I, P, T) when the OOTF (102) is applied with expressions (5) and (6). The mapped colors (I', P, T) may be obtained with expressions (5), (6) and optionally (7) below, rather than with expression (1) or (2) above.

Expressions (5) and (6) preserve chromaticities/hues of scene pixel values as the P and T components of the ICtCp color space are not affected by the application of the OOTF(102) in the I component of the ICtCp color space. More specifically, the same scene pixel values in the P and T components of the ICtCp in the scene image can be outputted as mapped pixel values in the P and T components of the ICtCp in a corresponding mapped image generated from the scene image based on the OOTF (102), thereby preserving the chromaticities/hues of scene colors as captured in the scene image in the mapped image.

In some embodiments, a slight increase or boost in the saturation of a mapped pixel is desired when the tonal contrast of the mapped pixel is increased. Thus, in some embodiments, an optional third step of the second method is to apply an adjustment to mapped pixel values in both P and T components of the ICtCp color space, without affecting an existing ratio between the mapped pixel values in the P and T components of the ICtCp color space. The adjustment to be optionally applied to the P and T component by this third step may be derived from the adjustment that was applied to the I component in the ICtCp color space, as shown in the following expressions:

$$P'=P*(I'-I+1) \quad (7\text{-}1)$$

$$T'=T*(I'-I+1) \quad (7\text{-}2)$$

where P' and T' denote saturation-adjusted P and T components in the ICtCp color space; a saturation adjustment factor is represented by (I'-I+1).

This causes the saturation of a mapped pixel with these pixel values to be increased or boosted, where the OOTF-adapted brightness (as represented by I') of the mapped pixel is mapped higher than original scene brightness (as represented by I) of a corresponding scene pixel, and decreased or lessened where the OOTF-adapted brightness of the mapped pixel is mapped darker than the original scene brightness of the scene pixel. These saturation adjustments may be used to compensate partially for the Hunt Effect, which indicates that the human vision system tends to perceive brighter colors as having more saturation. It should be noted that while the saturation represented by a combination of the P and T components is changed (e.g., the P and T components collectively adjusted by the same scaling factor (I'−I+1), etc.) by this optional third step of the second method, the hue is still preserved as the P and T components remain (e.g., relatively, etc.) constant in relation to each other.

Figure 1B:
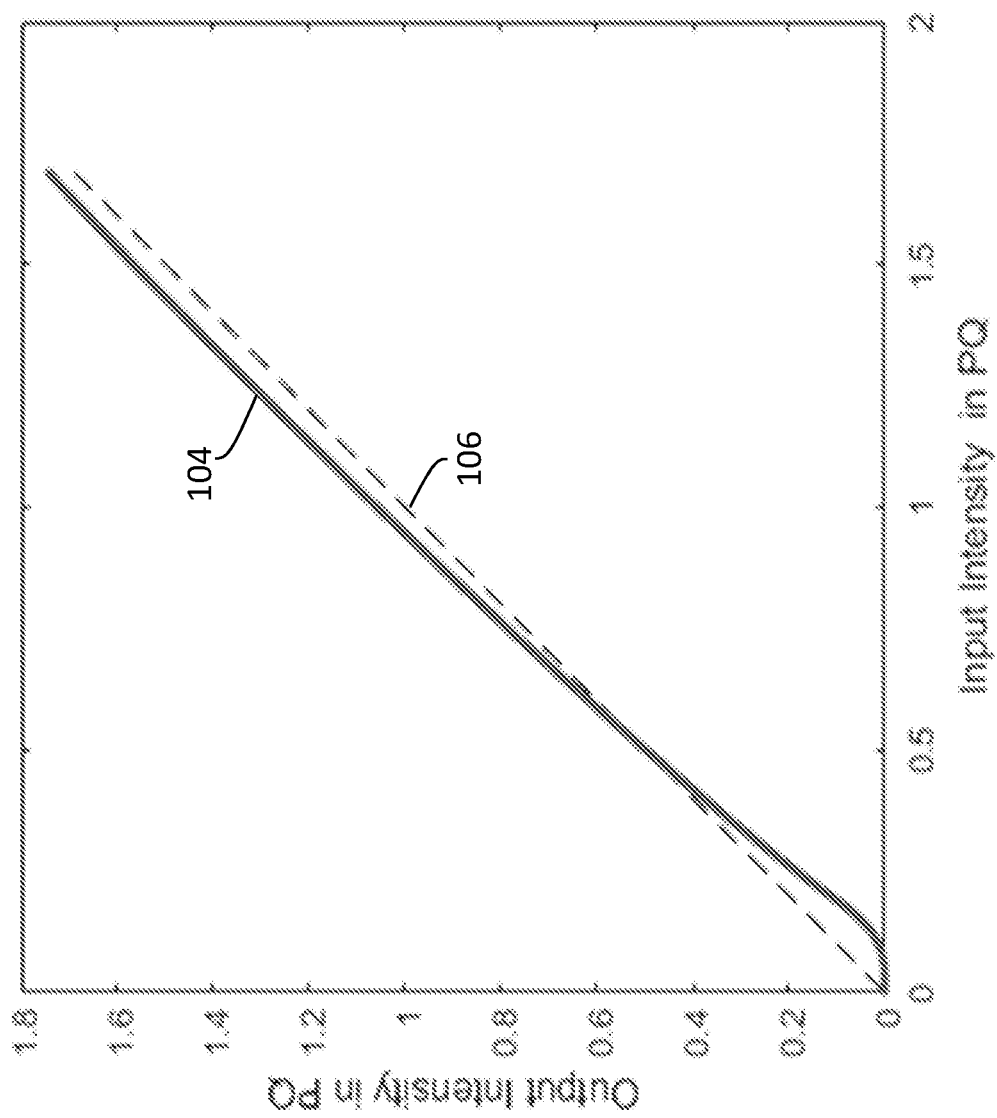
FIG. 1B, FIG. 1G and FIG. 1H illustrate example (e.g., tone, OOTF-based, etc.) mapping curves.

FIG. 1B illustrates an example tone mapping curve 104 (e.g., based on expressions (5) and (6), etc.) that maps scene light levels (denoted as "Input Intensity"; as represented by I) to mapped light levels (denoted as "Output Intensity"; as represented by I') under the second method as described above. In contrast to the linear relationship 106, the tone mapping curve (104) represents a non-linear relationship. In some embodiments, both of the scene light level (I) and the mapped light level (I') are perceptually quantized. It should be noted, however, that in various embodiments, none, one or both of the scene light level (I) and the mapped light level (I') may be perceptually quantized, non-perceptually quantized, linearly quantized, nonlinearly quantized, etc.

Figure 1C:
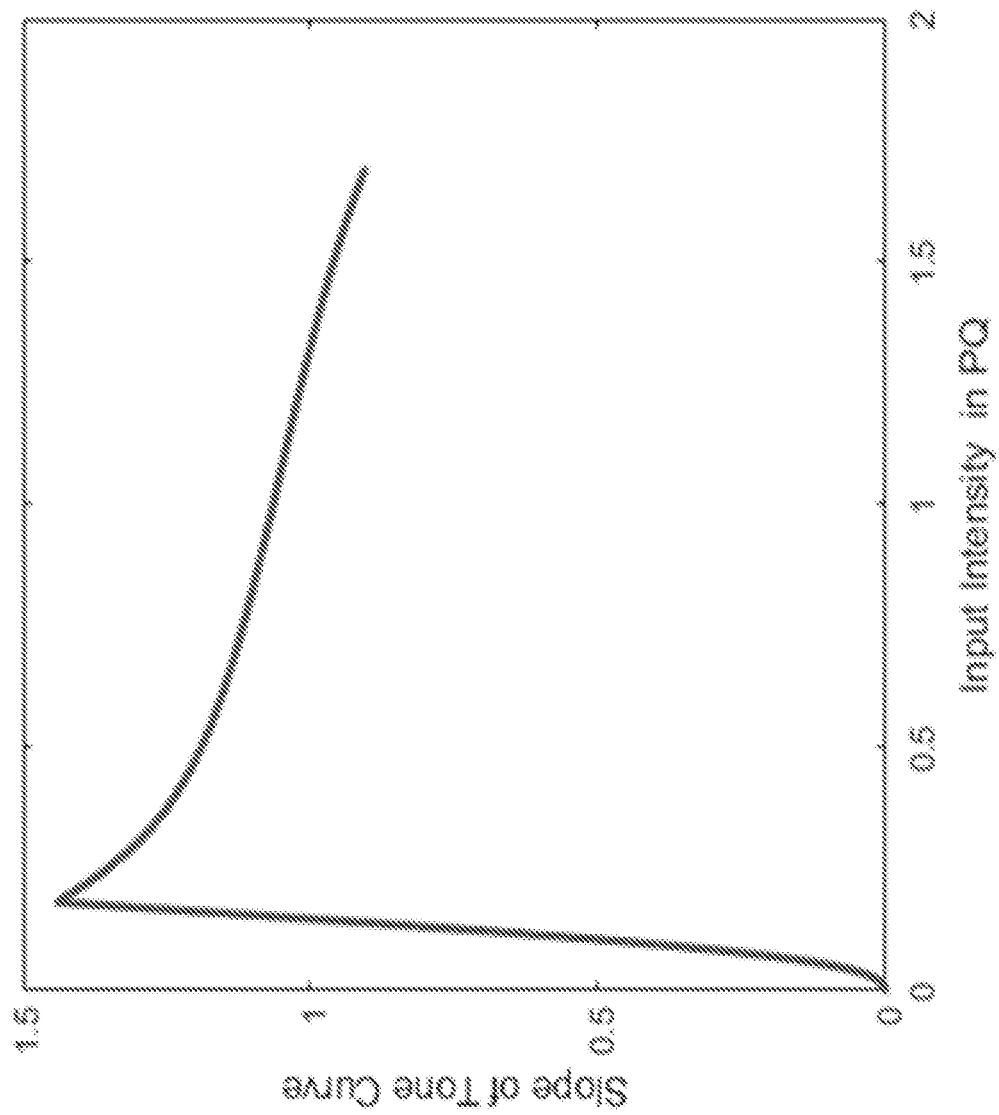
FIG. 1C illustrates an example local contrast curve.

FIG. 1C illustrates an example local contrast curve that corresponds to the tone mapping curve (104) of FIG. 1B. The local contrast curve represents a mapping from luminance (denoted as "Input intensity"; represented as PQ codewords) to local contrast (denoted as "slope of Tone curve"). The mapping from the luminance to the local contrast in FIG. 1C can be obtained by taking derivatives of the tone mapping curve (104) such as illustrated in FIG. 1B over the luminance. As shown in FIG. 1C, the local contrast is reduced (which helps reduce noise) in relatively low luminance (e.g., low light levels, dark regions, etc.), and is increased to nearly 1.5 for mid-tones before being reduced further at relatively high luminance (e.g., high light levels, bright regions, etc.).

Figure 1D:
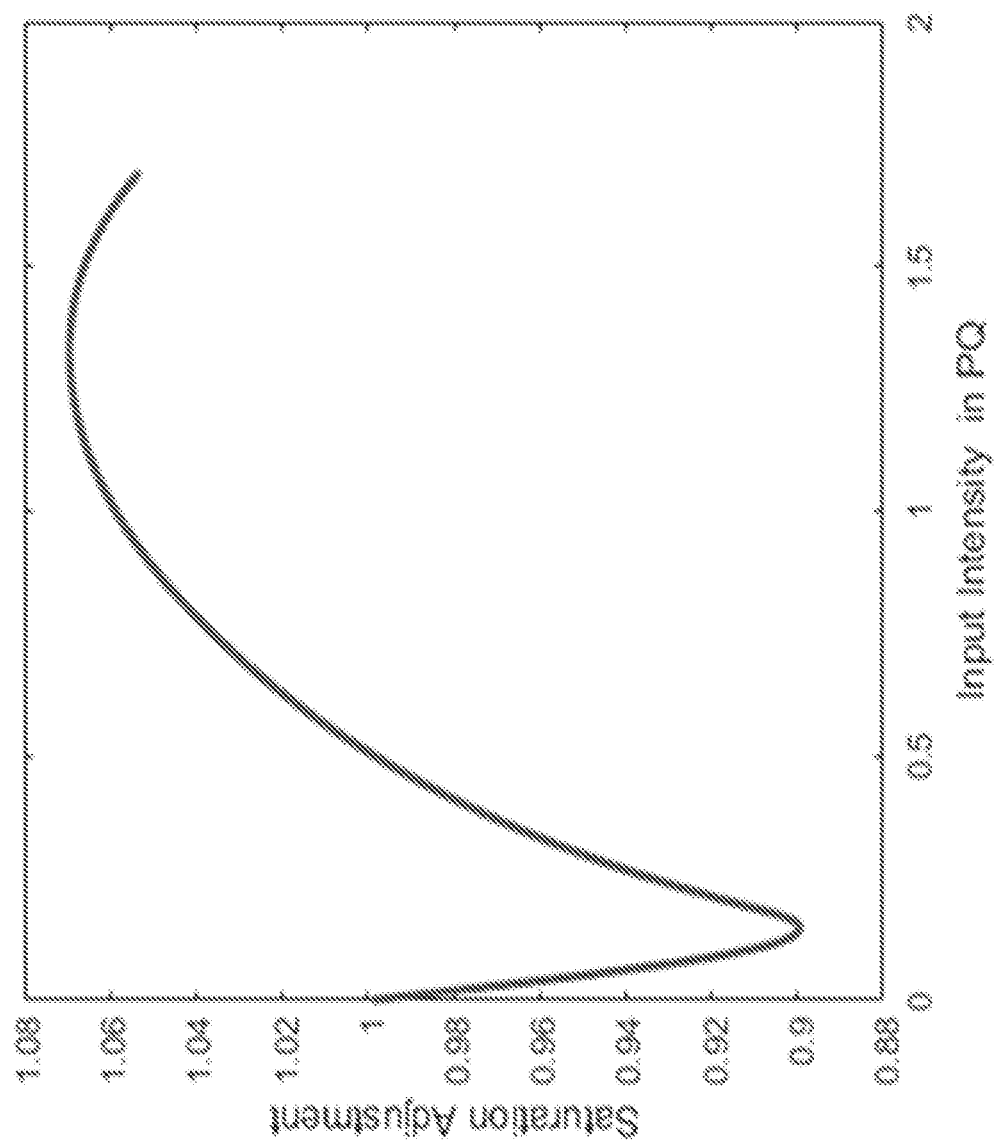
FIG. 1D illustrates an example saturation adjustment curve.

FIG. 1D illustrates an example saturation adjustment curve generated based on the saturation adjustment factor (I'−I+1) in expression (7). The saturation adjustment curve represents a mapping from luminance (denoted as "Input intensity"; represented as PQ codewords) to the values of the saturation adjustment factor (denoted as "Saturation adjustment"). As shown in FIG. 1D, the saturation is reduced in the low luminance (e.g., low light levels, dark regions, etc.), and is increased in the high luminance (e.g., high light levels, bright regions, etc.). These saturation adjustments can be used to compensate for the Hunt Effect as well as to suppress chromatic noises at the low luminance levels.

By way of illustration, both of the scene light level (I) and the mapped light level (I') in the saturation adjustment factor may be perceptually quantized. As previously noted, in various embodiments, none, one or both of the scene light level (I) and the mapped light level (I') may be perceptually quantized. Thus, the saturation adjustment factor may use PQ or non-PQ light intensity values. Additionally, optionally or alternatively, other forms different from the one (I'−I+1) illustrated in expression (7), including but not limited to non-multiplicative factors, etc., may be used to boost or lessen the saturation while preserving the hue under techniques as described herein. For example, the saturation adjustment factor may alternatively be calculated as (I'/I). For example, the saturation adjustment factor may alternatively be calculated as (I'/I). In this example, the P and T component would be calculated as:

$$P'=P*(I'/I) \quad (7a\text{-}1)$$

$$T'=T*(I'/I) \quad (7a\text{-}2)$$

6. SCENE VIEWING ENVIRONMENTS

In some embodiments, adjusting scene light levels based on OOTF(s) can be applied differently depending on different scene viewing environments at different original scenes. In some embodiments, scene environment light levels can be used to represent the scene viewing environments for viewers at the original scenes. Example scene environment light levels include, but are not necessarily limited to, one or more of: average scene light levels, ambient scene light levels, average illumination of some or all portions of the original scenes, average luminance of the original scenes, light adaptation levels of viewers in situ in the original scenes, etc.

A light adaptation level refers to a light level to which a viewer's eye(s) is adapted in a scene viewing environment. As different viewers in situ at the same original scene may focus on different parts of the original scene, the different viewers may be adapted to different scene environment light levels in the same original scene, especially when the original scene comprises large variations in scene light levels in different parts of the original scene. A viewer viewing a bright region in a relatively dim original scene may be adapted to a relatively high light level of the bright region. Conversely, a viewer viewing a dark region in a relatively bright original scene may be adapted to a relatively dim light level of the dark region.

A light adaptation level may be determined subjectively or objectively as one of: an actual light adaptation level of a viewer, a light adaptation level computed based on a model of the human vision system, a luminance level determined/computed for scene portions to which a viewer directs the viewer's field of vision, a luminance level determined/computed for a background surrounding scene portions to which the viewer directs the viewer's field of vision, etc.

In some embodiments, a scene environment light level representing a scene viewing environment of an original scene can be determined or computed from some or all pixel values of one or more original images captured from the original scene.

In some embodiments, a scene environment light level representing a scene viewing environment of an original scene can be determined as an ambient light level as measured by one or more ambient light sensors deployed in situ in the original scene. The ambient light sensors may be a part of, or may be separate devices operating in conjunction with, a camera system that captures source images as described herein.

In some embodiments, a scene environment light level representing a scene viewing environment of an original scene can be determined based on image related metadata. The image related metadata may be transmitted with one or more scene images (e.g., in one or more time sequences of scene images, in one or more video signals, in one or more video files, etc.) of the original scene in one or more side channels. The image related metadata carries light level information specifying an ambient light level that is contemporaneous with capturing the scene images. The light level information specifying the ambient light level may be automatically computed using measurement data taken by the ambient light sensors. Additionally, optionally or alternatively, at least some of the light level information may be manually inputted by a user such as a viewer, a photographer, a mobile device user, etc.

In some embodiments, an ambient light level and/or chromaticity of an original scene may be estimated from any combination of geographic information, weather information, locational information, sensory information, etc. For example, GPS coordinates of the original scene may be stored with one or more scene image captured from the original scene and may be used by subsequent image processing operations including but not limited to OOTF-based image processing operations to deduce a geographic location of the original scene, such as a road, a corner of a shopping mall, a floor of a building, a tunnel, a bridge, etc. The geographic location of the original scene may be combined with timing information (e.g., carried as a part of image-related metadata, etc.) of the original scene to determine the ambient light level of the original scene.

In some embodiments, a spatial direction of (e.g., an optical axis of, etc.) a camera system used in capturing one or more scene images from an original scene, a range of solid angle(s) covered in the scene images, etc., is recorded in or deduced from image-related data (and/or image content) of the scene images. The spatial direction of the camera system used in capturing the scene images, the range of solid angle(s) covered in the scene images, etc., can be used as a part of the basis to determine an ambient light level or a light adaptation level of a (conceptual) viewer modeling the camera system.

Additionally, optionally or alternatively, other information not necessarily limited to image-related metadata may be used to determine an ambient light level, an ambient light chromaticity, a light adaptation level, etc. For example, sunrise/sunset time information, weather information, geographic map information, building maps, architectural layouts, etc., at an original scene may be ascertained from one or more information sources, databases, cloud-based servers, in-premise servers, etc.; such information can be used independently or in combination with other information to determine or estimate the ambient light level, the light adaptation level, etc.

7. ADAPTING OOTF BY INTERPOLATION

In many cases, an OOTF can be used to adjust bright scene light levels to mapped light levels supported on a dimmer display (or display device) in a relatively dim display viewing environment. An example of display viewing environment may be, but is not necessarily limited to only, be a viewing environment (e.g., of a display environment light level of 5 nits, etc.) in which a display is surrounded by 5 nits background wall.

In scenarios in which original scenes are relatively dim such as those filmed at night, a display (or a display device) may be able to reproduce absolute scene light levels of an original scene in a display viewing environment comparable to a scene viewing environment of the original scene perfectly, perceptually or faithfully. Thus, in these scenarios, OOTF adaptation is not needed for mapping the scene light levels that are already supported by the display.

In some embodiments, instead of applying the same fixed OOTF to scene light levels of original scenes with varying scene viewing environments, adaptive OOTFs may be computed or determined based on different scene viewing environments of original scenes.

For example, an adaptive OOTF' for an original scene can be computed or determined by interpolating between a first OOTF (denoted as "$OOTF_1$") and a second OOTF (denoted as "$OOTF_2$") based on an interpolation factor $\alpha$, where $\alpha$ is related to a scene environment light level representing a scene viewing environment of the original scene, as shown in the following expression:

$$OOTF'(I) = OOTF_1(I)*\alpha + (1-\alpha)*OOTF_2 \qquad (8)$$

where $\alpha$ is set or calculated based on the scene environment light level. The interpolation factor $\alpha$ may be proportional to, linearly dependent on, non-linearly dependent on, etc., the scene environment light level. The first term and the second term on the right-hand-side (RHS) of expression (8) represents respectively a contribution from the first OOTF ("$OOTF_1$") and a separate contribution from the second OOTF ("$OOTF_2$").

In some embodiments, the first OOTF ("$OOTF_1$") represents a reference OOTF that maps normalized scene light levels to mapped light levels appropriate for a reference display viewing environment (e.g., 5 nit surround, etc.), whereas the second OOTF ("$OOTF_2$") represents a no-op OOTF (or an identity mapping) that performs no or little adaptation on scene light levels. In some embodiments, the second OOTF ("$OOTF_2$") may be represented by a straight line as illustrated by the second term of the RHS of expression (8). It should be noted that in some other embodiments, the second OOTF ("$OOTF_2$") may represent a non-identity mapping (instead of a straight line or an identity mapping) that performs different adaptation on scene light levels from the adaption performed by the first OOTF ("$OOTF_1$").

Additionally, optionally or alternatively, instead of interpolating between two or more OOTFS such as a reference OOTF, a straight line, etc., an adaptive OOTF can be determined based on other methods including but not limited to using a functional whose form is adaptable based on a scene environment light level representing a scene viewing environment of an original scene.

For example, the form of the functional for determining an adaptive OOTF can include a parameter or variable with a value to be calculated based on the scene environment light level. The value for the parameter or variable in the functional may be proportional to, linearly dependent on, non-linearly dependent on, etc., the scene environment light level.

8. SELECTING OPTIMAL OOTF

The goal of OOTF-based light level mapping is typically to adjust or normalize scene light levels in original scenes of varying scene viewing environments to mapped light levels; the mapped light levels can be used to further generate display light levels in display images (e.g., in one or more time sequences of display images, in one or more video signals, in one or more video files, etc.) to be rendered in a reference viewing environment. Given variations in scene viewing environments in different original scenes, appropriate surround compensations (or adjustments) for a specific scene viewing environment in a specific original scene can be calculated by comparing a scene environment light level representing the specific scene viewing environment and a reference environment light level of the reference viewing environment.

By way of example but not limitation, the reference viewing environment may be specified by ITU-BT.2100 with the reference environment light level of a 5 nits surround light level.

If the scene environment light level is the same as (e.g., exactly, within a certain marginal error, etc.) the reference environment light level, then no surround compensation is applied to adjust a reference OOTF associated with the reference environment light level for the original scene with the scene viewing environment represented by the scene environment light level. Here, the reference OOTF may be defined or specified for the reference viewing environment, and may be represented as a default OOTF, a straight line, etc. For example, the reference OOTF may correspond to the reference PQ OOTF specified in ITU-R BT.2100.

In some embodiments, the scene environment light level is deemed as the same as the reference environment light level if the difference between the scene environment light level and the reference environment light level is relatively small, for example, within a fixed error, within a threshold (e.g., 10%, 5%, 15%, etc.) of the smaller of the scene environment light level and the reference environment light level, etc.

In some embodiments, for original scenes with scene environment light levels (e.g., 100 nits, 500 nits, 0 nit, etc.) brighter or darker than the reference environment light level, surround compensations are applied to adjust the reference OOTF for the original scenes based on the respective scene environment light levels that represent scene viewing environments of the original scenes. The surround compensations can be so selected to produce perceptually the same visual appearance or local contrasts of the original scenes in mapped light levels rendered in the reference viewing environment.

For example, if a scene environment light level representing a scene viewing environment of an original scene is higher than the reference environment light level, then a surround compensation can be specifically selected to cause reducing local contrasts at relatively dark luminance levels and can be used to adjust the reference OOTF to a specific OOTF for the scene viewing environment. The specific OOTF maps scene light levels of scene images captured from the original scene into mapped light levels with reduced local contrasts at relatively dark luminance levels.

On the other hand, if a scene environment light level representing a scene viewing environment of an original scene is lower than the reference environment light level, then a surround compensation can be specifically selected to cause increasing local contrasts at relatively dark luminance levels and can be used to adjust the reference OOTF to a specific OOTF for the scene viewing environment. The specific OOTF maps scene light levels of scene images captured from the original scene into mapped light levels with increased local contrasts at relatively dark luminance levels.

Surround compensations as described herein can be applied independently or in conjunction with a reference (or "default") OOTF. In various embodiments, the compensations may be applied before, at the same time as, or after the reference OOTF is applied.

In some embodiments, a specific scene environment light level representing a specific scene viewing environment of an original scene is used to select or determine a specific surround compensation curve among a plurality of surround compensation curves for the purpose of applying surround compensation as described herein. Each surround compensation curve in the plurality of surround compensation curves may represent an individual tone mapping curve (or mapping curve analogous to a tone mapping curve) for a corresponding scene environment light level. The specific surround compensation curve selected from the plurality of surround compensation curves based on the specific scene light level may be used to adapt the reference OOTF to a specific OOTF for the specific original scene, or alternatively to apply surround compensation in addition to the reference OOTF, etc.

Figure 1E:
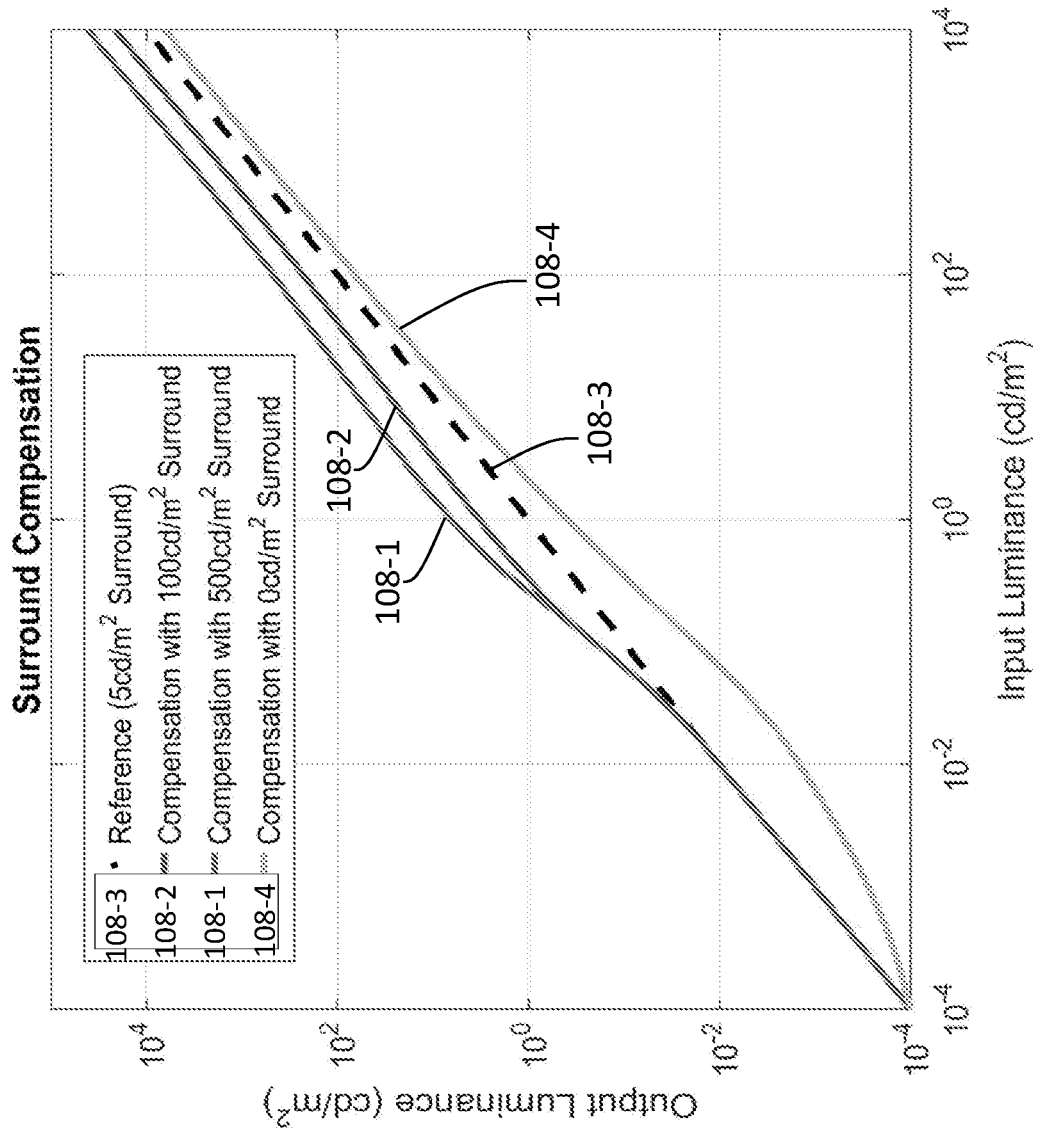
FIG. 1E illustrates an example family of surround compensation curves.

FIG. 1E illustrates an example family of surround compensation curves (e.g., 108-1 through 108-4, etc.) that correspond to different scene environment light levels representing different scene viewing environments. In various embodiments, none, one, some or all of the compensation curves in the family can be computed beforehand or at run time. In some embodiments, a surround compensation curve (e.g., any of 108-1 through 108-4, etc.) may be defined or specified as a mapping curve between input light levels (e.g., "Input Luminance" in nits as shown in FIG. 1E) and output light levels (e.g., "Output Luminance" in cd/m$^2$ or nits as shown in FIG. 1E). The surround compensation curve can be applied independently or in conjunction with the reference OOTF. In various embodiments, a surround compensation curve (e.g., any of 108-1 through 108-4, etc.) may be applied before, at the same time as, or after the reference OOTF is applied.

As illustrated in FIG. 1E, the first surround compensation curve (108-1) corresponds to a first scene environment light level of 500 cd/m$^2$; the second surround compensation curve (108-2) corresponds to a second scene environment light level of 100 cd/m$^2$; the third surround compensation curve (108-3) corresponds to a third scene environment light level of 5 cd/m$^2$; the fourth surround compensation curve (108-4) corresponds to a fourth scene environment light level of 0 cd/m$^2$.

Figure 1F:
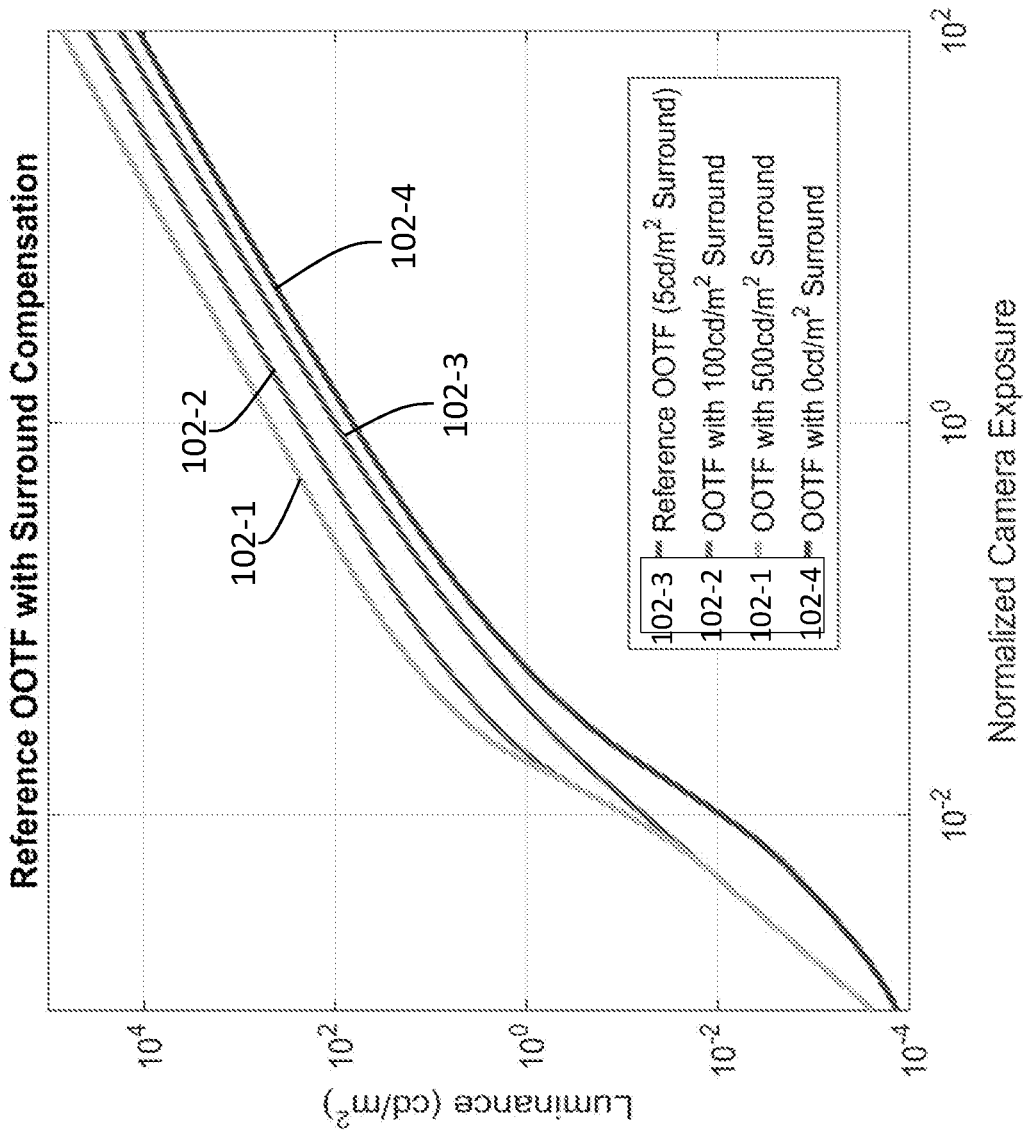

FIG. 1F illustrates an example family of OOTFs (e.g., 102-1 through 102-4, etc.) that correspond to different scene environment light levels representing different scene viewing environments. In various embodiments, none, one, some or all of the OOTFs in the family may be computed beforehand or at run time. Each of the OOTFs (e.g., 102-1 through 102-4, etc.) can be used to map relative scene light levels (denoted as "Normalized Camera Exposure") as captured with a normalized camera exposure setting to mapped light levels (denoted as "Luminance"; represented in absolute light levels, in nits, as luma values, etc.) for a specific scene environment light level. In some embodiments, these OOTFs (e.g., 102-1 through 102-4, etc.) may be obtained by combining, convolving or concatenating a reference OOTF (e.g., 102-3, etc.) with the surround compensation curves (e.g., 108-1 through 108-4, etc.). As shown in FIG. 1F, the first OOTF curve (102-1) corresponds to the first scene environment light level of 500 nits (or cd/m$^2$), and may be obtained by combining the reference OOTF (102-3) with the first surround compensation curve (108-1). Likewise, the second OOTF curve (102-2) corresponds to the second scene environment light level of 100 nits, and may be obtained by combining the reference OOTF (102-3) with the second surround compensation curve (108-2). The third OOTF curve (102-3) corresponds to the third scene environment light level of 5 nits, and may be obtained by combining the reference OOTF (102-3) with the third surround compensation curve (108-3). Since the third surround compensation curve (108-3) is a straight line, the third OOTF curve (102-3) is the same as the reference OOTF (102-3). The fourth OOTF curve (102-4) corresponds to the fourth scene environment light level of 0 nits, and may be obtained by combining the reference OOTF (102-3) with the fourth surround compensation curve (108-4).

Additionally, optionally or alternatively, instead of combining a reference OOTF with surround compensation curves, a specific OOTF, which corresponds to a specific scene environment light level representing a specific scene viewing environment of a specific original scene, may be selected from a family of (available) OOTFs. In various embodiments, none, one, some or all of the OOTFs in the family can be computed beforehand or at run time. Each OOTF in the family of OOTFs may correspond to an optimized OOTF for a corresponding scene environment light level representing a scene viewing environment of an original scene.

For example, the family of OOTFs may be indexed by a plurality of corresponding scene environment light levels representing varying scene viewing environments of original scenes. The specific scene environment light level may be used as a key to search for or identify the specific OOTF. The specific OOTF maps scene light levels of scene images captured from the original scene into mapped light levels to be rendered in a (e.g., reference, default, etc.) display viewing environment that may or may not be different from the specific scene viewing environment.

In an example, when a viewer is determined to be adapted to a first scene environment light level (e.g., 500 nits, etc.) corresponding to a relatively bright environment (e.g., 500 nit surround light level, etc.), a first OOTF (e.g., 102-1, etc.) may be selected for the relatively bright environment based at least in part on the first scene environment light level. The first OOTF may have local contrasts redistributed relative to a reference OOTF (e.g., 102 of FIG. 1A, 102-3, etc.) for the reference viewing environment (e.g., 5-nit surround light level, etc.) to compensate for decreased contrast sensitivity of the viewer's eyes at the relatively dark light levels in the relatively bright environment.

In another example, when a viewer is determined to be adapted to a second scene environment light level (e.g., 0 nits, etc.) corresponding to a relatively dark environment (e.g., 0 nit surround light level, etc.), a second OOTF (e.g., 102-4, etc.) may be selected based at least in part on the second scene environment light level. The second OOTF (102-4) may have local contrasts redistributed relative to the reference OOTF (e.g., 102 of FIG. 1A, 102-3, etc.) for the reference viewing environment (e.g., 5-nit surround light level, etc.) to compensate for increased contrast sensitivity of the viewer's eyes at the relatively dark light levels in the relatively dark environment.

Thus, under techniques as described herein, where the viewer is adapted to visually discerning more local contrasts or more image contrasts for certain light levels (e.g., relatively dark light levels, mid-tone light levels, relatively bright light levels, etc.) at a given light adaptation level, an optimal OOTF may be specifically selected for the light adaptation level (or scene environment light level representing a scene viewing environment of the original scene) from an OOTF family. The optimal OOTF allocates more local contrasts or more image contrasts for these light levels more visually discernable to the viewer. As a result, image details as represented in scene images of the original scene are preserved in mapped images.

Conversely, where the viewer is adapted to visually discerning fewer local contrasts or fewer image contrasts for certain light levels (e.g., relatively dark light levels, mid-tone light levels, relatively bright light levels, etc.) at a given light adaptation level, an optimal OOTF may be specifically selected for the light adaptation level (or scene environment light level) from the OOTF family. The optimal OOTF allocates fewer contrasts or fewer image contrasts for these light levels less discernable to the viewer. Thus, codewords can be more efficiently utilized or compressed without impacting perceptual qualities of mapped images as compared with corresponding scene images of the original scene.

9. PERFORMING OOTF BY WAY OF DISPLAY MANAGEMENT

In some embodiments, mapping operations such as display management (DM) mapping, tone mapping, gamut mapping, etc., can be used to map reference video content designated/optimized for a reference display device to device-specific video content mapped/optimized for a specific display device that may have device-specific display capabilities in terms of dynamic range and color gamut different from reference display capabilities of the reference display device. Generally speaking, a mapping operation may refer to a mapping performed in an OOTF-based operation, OETF-based operation, a DM operation, a non-DM operation, etc., that alters a first signal of a first dynamic range (and/or a first viewing environment) to a second signal of a second dynamic range (and/or a second viewing environment), where the second dynamic range may be equal to, lower, or higher, than the first dynamic range. For the purpose of illustration only, some descriptions may use DM related mappings as example mapping operations. It should be noted, however, that techniques as described herein are not necessarily limited to DM related mappings, but may operate with a wide variety of non-DM related mappings that can be used to map pre-mapped signals of pre-mapped dynamic ranges (and/or pre-mapped viewing environments) to mapped signals of mapped dynamic ranges (and mapped viewing environments). Example reference video content mapped by the DM operations may, but is not necessarily limited to only, be a studio release version of a media program with studio-based image content modifications representing the artistic intent of a colorist, artistic director, a video professional, a user, etc.

As used herein, the term high dynamic range (HDR) may refer to a dynamic range (DR) breadth that spans some 14-15 orders of magnitude of the human visual system (HVS). As used herein, the terms enhanced dynamic range (EDR) or visual dynamic range (VDR) may individually or interchangeably relate to the DR that is simultaneously perceivable by a human visual system (HVS). As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images such as scene images, intermediate images, mapped images, display images, etc., comprise one or more color components (e.g., R, G and B pixel values in an RGB color space; Y, Cb and Cr pixel values in an YCbCr color space; X, Y and Z pixel values in an XYZ color space; L, M and S pixel values in an LMS color space; I, P and T pixel values in an ITP or ICtCp color space; etc.) wherein each color component is represented by a precision of n-bits per pixel (e.g., n=8, 10, 12 or 16).

EDR and HDR images may also be stored and distributed using high-precision (e.g., 16-bit) floating-point formats, such as the OpenEXR file format developed by Industrial Light and Magic.

Most consumer desktop displays support peak luminance of 200 to 300 cd/m2 or nits. Most consumer HDTVs range from 300 to 1000 cd/m2. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories, etc.), EDR content may be color graded and displayed on EDR displays that support higher dynamic ranges (e.g., from 1,000 nits to 5,000 nits or more). In general, the methods of the present disclosure relate to any dynamic range higher than SDR. As appreciated by the inventors here, improved techniques for the display management of high-dynamic range images onto HDR and SDR displays are desirable for both backward compatibility and a superior immersive experience.

As used herein, the term "display management" denotes the processing (e.g., tone mapping, gamut mapping, etc.) required to map an input video signal of a first dynamic range (e.g., 1000 nits) to a display of a second dynamic range (e.g., 500 nits).

Examples of display management operations can be found in PCT Application Ser. No. PCT/US2016/013352, filed on Jan. 14, 2016, which is incorporated herein by reference in its entirety. Additional examples of display management operations can be found in PCT Application Ser. No. PCT/US2016/031920, filed on May 11, 2016, which is incorporated herein by reference in its entirety.

In some embodiments, DM operations can be extended to map scene images acquired/captured from an original scene to specific display images mapped/optimized for a specific display device. These DM operations preserve the visual appearance original scene as perceived by a viewer in situ at the original scene in the visual appearance of the specific display images as generated by the DM operations and as rendered on the specific display device in terms of visually perceivable contrasts and/or visually perceivable chromaticities as were perceivable by the viewer at the original scene.

Under techniques as described herein, the scene images of the original scene as captured by a camera system at the original scene represent virtual views of the original scene through a virtual window (or a virtual display) as would be visually perceived by the viewer at the original scene.

A scene environment light level representing a scene viewing environment of this virtual window (or virtual display) as previously discussed may be determined as one of: an ambient light level, a light adaptation level, average luminance of one or more scene images, average luminance of one or more portions of the scene images, average luminance of surrounding scene portions surrounding the original scene, etc. Any of these foregoing examples of scene environment light levels representing scene viewing environments may represent one of: a physical light level, a modeled light level, an estimated light level, a computed light level determined based on normalized light levels represented by pixel values and/or exposure settings, a light level derived from light sensor measurements, etc.

In some embodiments, the scene viewing environment of the virtual window (or virtual display) may be represented by an average surround luminance/illumination in scene portions (e.g., in a viewer's vision field, in a virtual room represented by the original scene, etc.) surrounding the virtual window.

Additionally, optionally or alternatively, the scene environment light level representing the scene viewing environment may be determined as a light adaptation level for a viewer at the original scene to look through the virtual window or to look at a specific portion of the virtual window. The light adaptation level may be determined as a light level of the original scene while the viewer is adapted to the scene viewing environment.

Figure 3A:
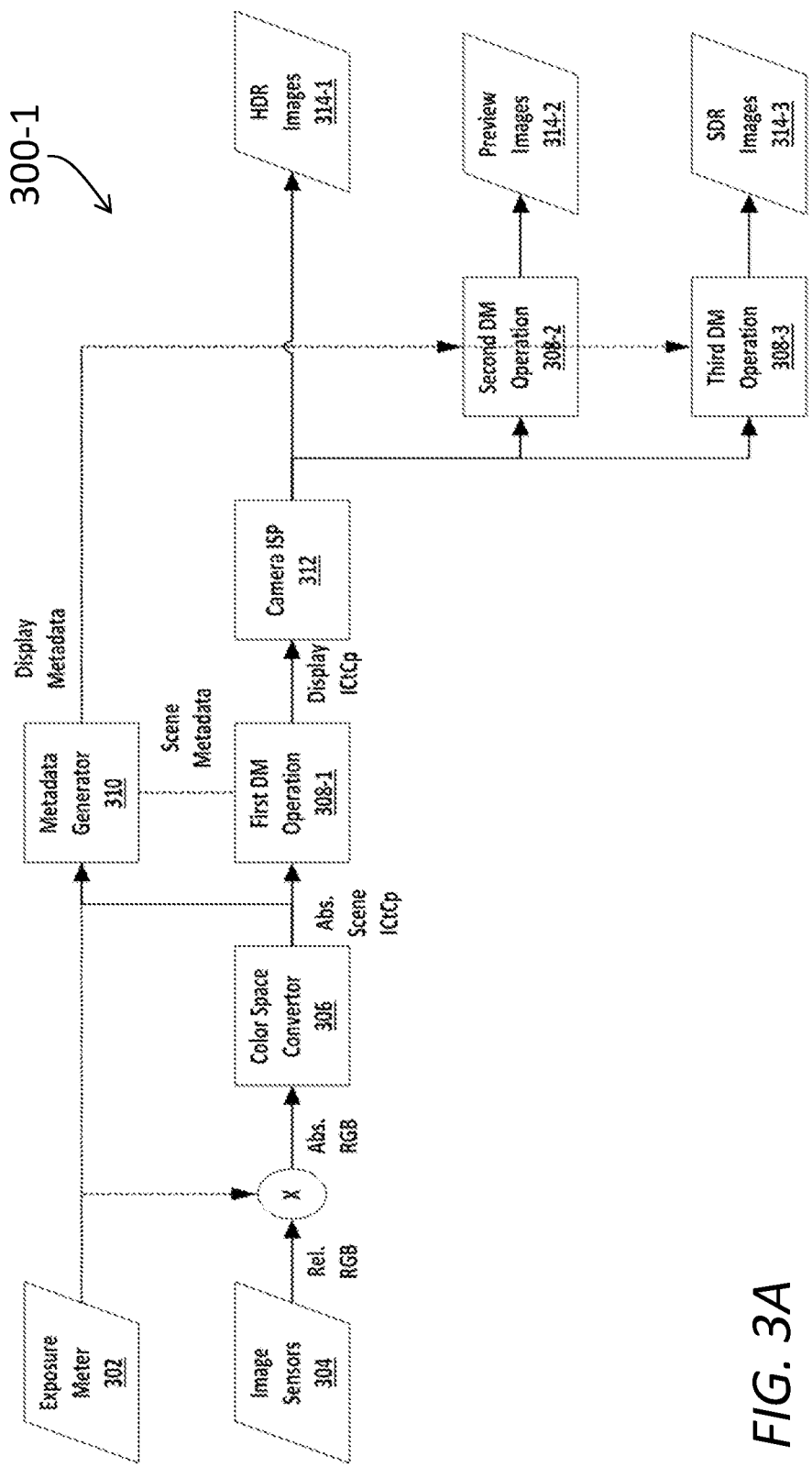
FIG. 3A through FIG. 3D illustrate example image processing pipelines.

FIG. 3A illustrates an example image processing pipeline 300-1 that DM operations perform OOTF like adaptive operations. Some or all of the image processing pipeline (300-1) may be implemented with one or more computing devices such as a camera system, a computing device operating in conjunction with a camera system, a production studio system, a media broadcast system, a media streaming system, a cloud-based system, a VR system, an AR system, a remote presence system, an automobile entertainment system, etc.

In some embodiments, one or more image sensors 304 (e.g., in a camera system, etc.) of the image processing pipeline (300-1) captures scene images from an original scene. Each of the scene images may comprise a plurality of sets of scene pixel values for a plurality of scene pixels in an image frame. The plurality of scene pixels may form a spatial shape that may be a combination of one or more of rectangular shapes, oval shapes, circular shapes, heart shapes, spherical shapes, regular shapes, irregular shapes, etc.

For the purpose of illustration only, a set of scene pixel values for a scene pixel in a scene image may comprise relative (linear)R, G and B values in an input RGB color space. These relative values may not represent absolute light levels in the R, G and B colors, but rather may represent relative light levels (in the R, G and B colors). The absolute light levels may have been normalized, by camera exposure settings used to acquire/capture the scene images virtually or physically from the original scene, into the relative values in one or more normalized ranges.

In some embodiments, the image processing pipeline (300-1) computes, based on a normalization/scaling factor (e.g., $\beta$ in expressions (5) and (6), 50, 100, 150, etc.) and the relative values represented by the plurality of sets of scene pixel values in the scene images, the corresponding absolute (linear) values. The normalization/scaling factor $\beta$ may be derived from exposure setting data received from an exposure meter 302. The absolute values may be used instead of the relative R, G and B values to represent the scene images in some or all of the subsequent image processing operations.

In some embodiments, the image processing pipeline (300-1) includes an input color space convertor 306 to convert the absolute R, G and B values that represent the scene images acquired/captured from the original scene to absolute L, M and S scene pixel values in an (e.g., intermediate, etc.) LMS color space, as shown in the following expression:

$$\begin{pmatrix} L \\ M \\ S \end{pmatrix} = \begin{pmatrix} 0.4120 & 0.5239 & 0.0641 \\ 0.1667 & 0.7204 & 0.1129 \\ 0.0241 & 0.0755 & 0.9004 \end{pmatrix} \begin{pmatrix} R \\ G \\ B \end{pmatrix} \quad (9)$$

In some other embodiments, instead of directly converting the R, G and B values into the L, M and S values as illustrated in expression (9) above, the absolute R, G and B values may be first converted into absolute X, Y and Z scene pixel values in an XYZ color space (e.g., the CIE XYZ color space, etc.); the X, Y and Z scene pixel values in the XYZ color space may then be converted into the absolute L, M and S scene pixel values in the LMS color space.

The absolute L, M and S scene pixel values in the LMS color space may be used to derive or recover absolute light levels of the original scene corresponding to the original relative values acquired/captured by the one or more image sensors (304) from the original scene. A diffuse white for the absolute light levels may or may not be capped or limited only to 1000 nits, 10,000 nits, 1 million nits, or even a higher (absolute) brightness level.

The absolute scene pixel values in the LMS color space may be further converted to PQ codewords in the LMS color space using an L2PQ conversion function (e.g., as illustrated in expression (5), etc.), which may be followed by a conversion operation from the PQ codewords in the LMS color space to corresponding PQ codewords in an ICtCp color space using a conversion matrix LMS2ITPmat (e.g., as illustrated in expression (5), etc.). The PQ codewords in the ICtCp may or may not be capped or limited only to 1000 nits, 10,000 nits, 1 million nits, or even a higher (absolute) brightness level.

In some embodiments, the image processing pipeline (300-1) includes a metadata generator (or calculator) 310 to generate a set of scene image metadata. The metadata generator (310) determines or estimates a range of absolute scene light levels in the original scene, which may be included in the set of scene image metadata.

The range of absolute scene light levels may refer to, without limitation, an entire range of absolute scene light levels, a substantial part in an entire range of absolute scene light levels, a range of absolute scene light levels with a max scene luminance set to the maximum light and/or a min scene luminance set to the minimum light level for a certain percentile (e.g., 90%, 95%, etc.) of all pixels, etc. In some embodiments, the range of absolute light levels in the original scene may be determined based on (a distribution of) scene pixel values in the I component of the ICtCp color space.

By way of example but not limitation, the range of light levels for the original scene may comprise a min scene luminance of 4 nits for the darkest pixels, a mid scene luminance of 200 nits for mid-tone pixels, and a max scene luminance of 1,000,000 nits for the brightest pixels. The min scene luminance, the mid scene luminance and the max scene luminance may correspond to PQ values of 0.23, 0.58, 1.42, respectively. The mid scene luminance may refer to, without limitation, one of: an average luminance in a distribution of scene light levels, a medium luminance in a distribution of scene light levels, an average luminance of a salient scene image portion, an average luminance of the most important scene image portion (e.g., a face detected by a face detection logic in the camera system, etc.), an average luminance of a semantically significant scene image portion (e.g., a car in a car chase scene, a particular character in an electronic game, etc.), an average luminance of a specific object or human figure presented in a VR application, in an AR application, a remote presence application, etc.

In some embodiments, the image processing pipeline (300-1) determines or estimates a scene environment light level that represents a scene viewing environment of the original scene. The scene environment light level may be contemporaneous with the capture of the scene images from the original scene and may be estimated using light level measurement data collected by the exposure meter (302), which may be a part of, or may operate in conjunction with the camera system used to acquire/capture the scene images. Additionally, optionally or alternatively, the scene environment light level may be estimated using the previously mentioned mid scene luminance (e.g., 200 nits, etc.) as determined for the range of absolute scene light levels of the original scenes.

In some embodiments, the image processing pipeline (300-1) performs one or more DM operations 308-1 through 308-3 on the scene images as represented by the PQ codewords in the ICtCp color space to generate display images for one or more target displays (or target display devices). Each of the one or more target displays may represent a display type with corresponding display capabilities specific to the display type.

In some embodiments, as illustrated in the image processing pipeline (300-1) of FIG. 3A, the one or more DM operations (308-1 through 308-3) supplant or replace OOTF-based light level mapping. In these embodiments, the OOTF-based light level mapping is not performed in addition to the DM operations; instead, the DM operations directly adapt or remap scene light levels into display light levels using tone mapping curves and/or surround compensation based on the scene environment light level representing the scene viewing environment of the original scene.

In some embodiments, the DM operations treat the scene viewing environment of the original scene as a virtual display viewing environment of a virtual display device, and further treat the scene images derived from the original scene as virtual display images that has been adapted to the virtual display device in the virtual display viewing environment.

By way of the surround compensation based on the scene environment light level representing the scene viewing environment of the original scene, the effects (or goal) of the OOTF-based light level mapping in other image processing pipelines (e.g., 300-1, etc.) may be achieved by the DM operations (e.g., 308-1 through 308-3) in the image processing pipeline (300-1) without separately performing OOTF-based light level mapping.

For example, the first DM operations (308-1) may implement and perform a DM algorithm that takes the scene images in the ICtCp color space as a first input, takes the set of scene image metadata generated by the metadata generator (310) as a second input, takes the scene environment light level the scene viewing environment of the original scene as a third input, takes a first display environment light level representing a first display viewing environment of a first target display as a fourth input. By way of example but not limitation, the first target display may be a high dynamic range (HDR) display device.

Based on some or all of the foregoing inputs, the first DM operation (308-1) performs the DM algorithm to generate corresponding first display images specifically adapted (or optimized) for the first target display. Additionally, optionally or alternatively, based on some or all of the inputs to the DM algorithm and the first display images, the first DM operation (308-1) performs the DM algorithm to generate a first set of display image metadata for the first display images.

In some embodiments, each of the first display images may be represented by a plurality of sets of display pixel values for a plurality of display pixels that form a spatial shape such as rectangular shapes, oval shapes, circular shapes, heart shapes, spherical shapes, regular shapes, irregular shapes, a combination of any of the foregoing, etc. In some embodiments, each set of display pixel values in the plurality of sets of display pixel values comprises a set of I, T and P display pixel values in the ICtCp color space for a corresponding display pixel in the display image. Additionally, optionally or alternatively, the first display images may be converted into a different output color space (e.g., RGB color space, YCbCr color space, LMS color space, XYZ color space, IPT color space, etc.) other than the ICtCp color space before being outputted to storage media, downstream devices, streaming clients, media players, etc.

In some embodiments, as a part of generating the first display images and the first set of display image metadata for the first target display, the first DM operation (308-1) performs the DM algorithm to determine whether the first target display is capable of reproducing scene light levels (e.g., the scene pixel values in the I component of the ICtCp color space, etc.) of the original scene. This may be determined by comparing the range of scene light levels (e.g., the max scene luminance, the mid scene luminance, the min scene luminance, etc.) as previously determined with the display capabilities of the first target display.

The first target display may be capable of supporting one or more ranges of display light levels that are associated with one or more automatically or manually settable display modes and/or user controls of the first target display. In some embodiments, the first target display may be capable of statically or dynamically selecting a suitable range of display light levels among the one or more supported ranges of display light levels, statically or dynamically adjusting a max display luminance (the brightest light level), a min display luminance (the darkest black level), etc., of a supported range of display light levels, etc., based on the range of scene light levels in the set of scene image metadata generated by the metadata generator (310).

In some embodiments, the first DM operation (308-1) performs the DM algorithm to determine whether a first display viewing environment of the first target display is the same as the scene viewing environment (or the scene environment light level) of the original scene. This may be determined by comparing the scene environment light level as previously determined of the original scene with a first display environment light level representing the first display viewing environment. In some embodiments, the scene environment light level is deemed as the same as the first display environment light level if the difference between the scene environment light level and the first display environment light level is relatively small, for example, within a fixed error, within a threshold (e.g., 10%, 5%, 15%, etc.) of the smaller of the scene environment light level and the first display environment light level, etc.

If the first target display is a reference HDR display device or a reference SDR display device, then the first display environment light level may be specified in a standard, a proprietary specification, etc., that defines the display capabilities of the reference HDR display device or the SDR display device.

If the first target display is a preview monitor of the camera system that acquires the scene images from the original scene, then the display environment light level may be set to the same as the scene environment light level.

In some embodiments, in response to determining that the first target display is capable of reproducing the scene light levels of the original scene and that the first display viewing environment of the first target display is the same as the scene viewing environment of the original scene, the first DM operation (308-1) performs the DM algorithm to reproduce (e.g., exactly, perfectly, faithfully, with a relatively high precision, subject to relatively small quantization/coding errors, etc.) the scene light levels in the first display images.

Figure 1G:
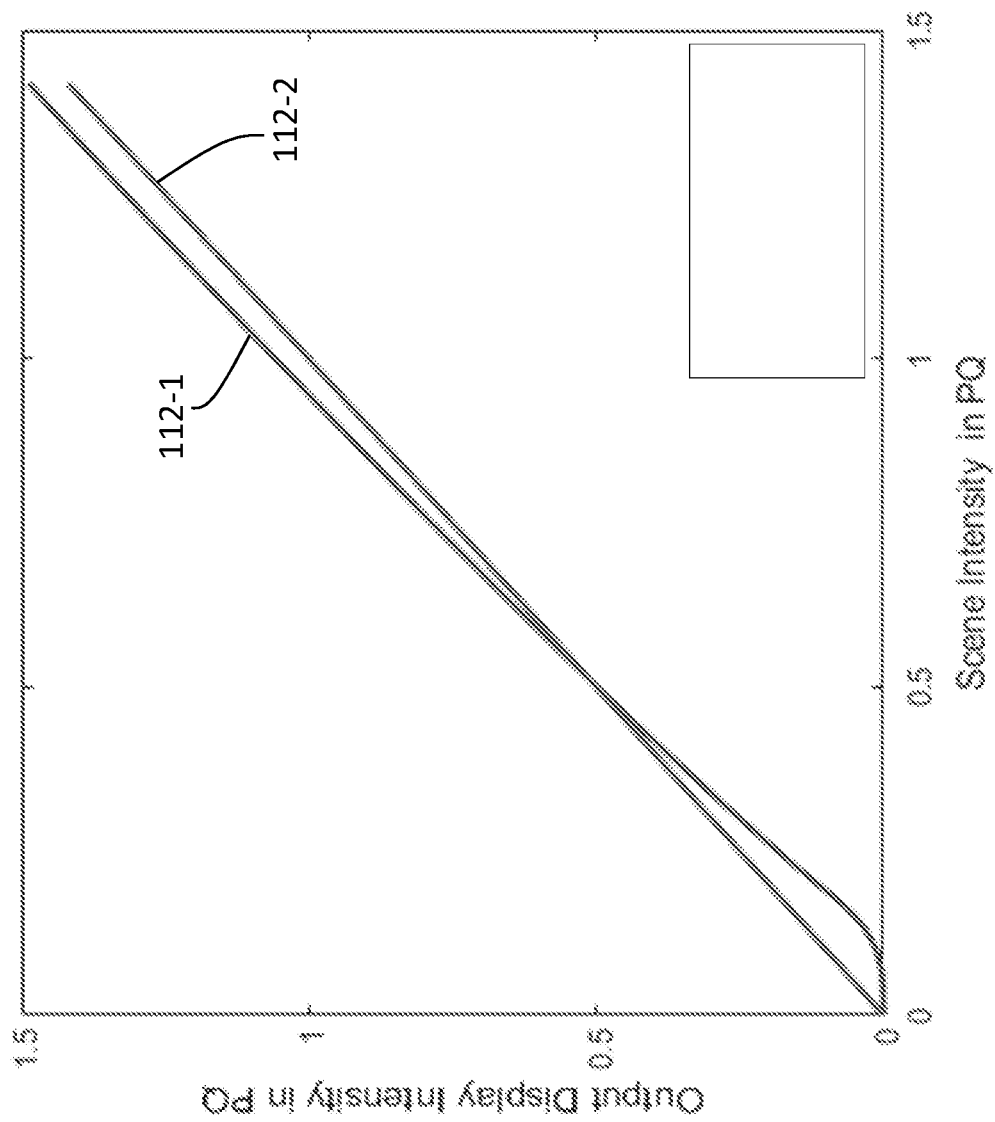

FIG. 1G illustrates example tone mapping curves 112-1 and 112-2. A first tone mapping curve (112-1) may be a reference tone mapping curve defined or specified for an assumed input/scene viewing environment to map input light levels or scene light levels (denoted as "Scene Intensity"; represented by input PQ codewords) to display light levels (denoted as "Output Display Intensity"; represented by output PQ codewords). By way of example but not limitation, the min scene luminance, the mid scene luminance and the max scene luminance for the scene light levels are 0, 200 and 10 k (in nits), respectively. In response to determining that the scene viewing environment is the same as the first display viewing environment of the first target display, and in response to determining that the range of scene light levels is within a supported range of display light level of the first target display, the first DM operation (308-1) uses a second tone mapping curve (112-2), which is actually mathematically reduced to a straight line, and which 1-1 maps a value of a scene light level to the same value of a corresponding display light level. Thus, the scene light levels are reproduced (e.g., exactly, perfectly, faithfully, with a relatively high precision, subject to relatively small quantization/coding errors, etc.) in the first display images.

In some embodiments, in response to determining that the first target display is not capable of reproducing the scene light levels of the original scene or that the first display viewing environment of the first target display is not the same as the scene viewing environment of the original scene, the first DM operation (308-1) performs the DM algorithm to tone map the scene light levels into corresponding display light levels in the first display images. The tone mapping of the scene light levels into the display light levels may be based on a first tone mapping curve.

In some embodiments, the first tone mapping curve may be specified or defined by a standard, a proprietary specification, etc. The first tone mapping curve may be specified or defined based on an assumed scene viewing environment such as a reference viewing environment specified by ITU-BT.2100, 5 nits of surround light level, etc.

Appropriate surround compensations (or adjustments) for the scene viewing environment in the original scene in relation to the assumed scene viewing environment can be determined by comparing the scene environment light level representing the scene viewing environment and an assumed environment light level of the assumed scene viewing environment.

If the scene environment light level is the same as the assumed environment light level, then no surround compensation is applied in addition to the first tone mapping curve. In some embodiments, the scene environment light level is deemed as the same as the assumed environment light level if the difference between the scene environment light level and the assumed environment light level is relatively small, for example, within a fixed error, within a threshold (e.g., 10%, 5%, 15%, etc.) of the smaller of the scene environment light level and the assumed environment light level, etc. The first tone mapping curve as defined or specified for the assumed scene viewing environment (which is the same as the scene viewing environment in the present example) can be used to map the scene light levels of the scene images captured from the original scene into the display light levels in the first display image.

If the scene environment light level is not the same as the assumed environment light level, then a surround compensation is applied in addition to the first tone mapping curve as defined or specified for the assumed scene viewing environment. The surround compensation may be based on a surround compensation curve such as illustrated in FIG. 1E, etc.

The surround compensation for the scene viewing environment can be applied independently or in conjunction with the first tone mapping curve defined or specified for the assumed scene viewing environment. In various embodiments, the surround compensations may be applied before, at the same time as, or after the first tone mapping curve is applied.

In some embodiments, the surround compensation can be used to modify the first tone mapping curve into a modified first tone mapping curve. The first DM operation (308-1) may perform the DM algorithm to tone map the scene light levels into the display light levels in the first display images based on the modified first tone mapping curve, rather than based on the first tone mapping curve. Thus, both (a) the surround compensation for the scene viewing environment and (b) the first tone mapping curve defined or specified for the assumed scene viewing environment are performed at the same time, rather than separately at different times.

In some embodiments, a family of modified tone mapping curves, or a part therein, may be generated beforehand or at run time. The family of modified tone mapping curves corresponds to a family of different surround compensations for different scene environment light levels.

At run time, the DM algorithm can use the scene environment light level to select a specific modified tone mapping curve from among the family of different modified tone mapping curves, and to apply the selected specific modified tone mapping curve to tone map the scene light levels into the display light levels, without separately performing an OOTF-based light level mapping and without separately performing a surround compensation.

Figure 1H:
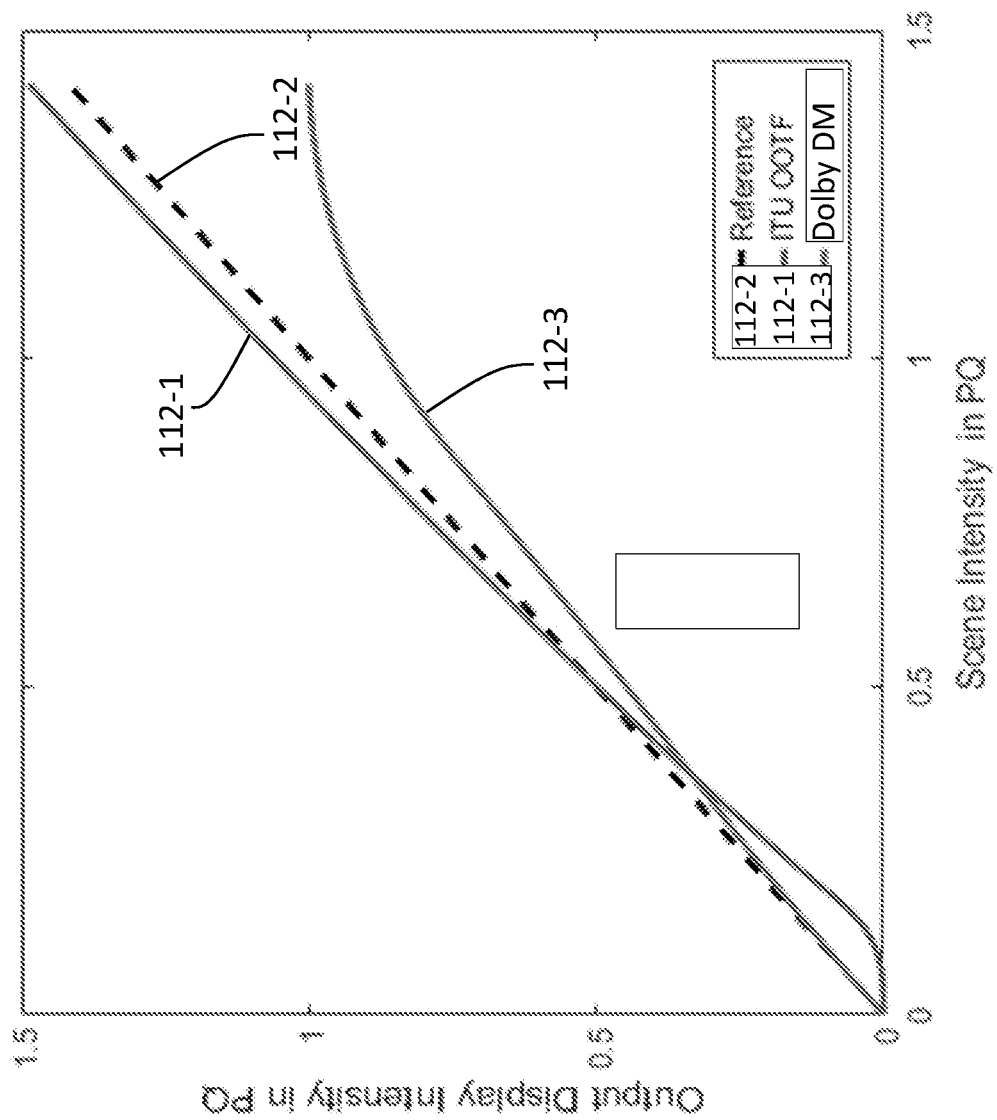

FIG. 1H illustrates an example third tone mapping curve 112-3 in addition to the first and second tone mapping curves (112-1 and 112-2). By way of example but not limitation, the min scene luminance, the mid scene luminance and the max scene luminance for the scene light levels are 0, 2000, 1M (in nits), respectively.

In response to determining that the scene viewing environment is the same as the first display viewing environment of the first target display, and in response to determining that that the range of scene light levels is beyond supported range(s) of display light level of the first target display, the first DM operation (308-1) uses the third tone mapping curve (112-3) to map the scene light levels to the display light levels. As can be seen in FIG. 1H, the highlights in the scene light levels are rolled off to fit into a supported range of display light levels supported by the first target display, and the mid-tones in the scene light levels are lowered (to lower luminance) in the display light levels just like applying an auto-exposure function to the scene light levels. Under techniques as described herein, some or all of scene-referred contrasts and chromaticities in the scene light levels as perceived by the human vision system, especially near the mid scene luminance, are reproduced in the first display images perceptually faithfully to the human vision system, etc. In some embodiments, in response to determining that the scene viewing environment is not the same as the first display viewing environment of the first target display, the first DM operation (308-1) uses the third tone mapping curve (112-3) that incorporates a surround compensation to take into consideration the difference between the scene viewing environment and the first display viewing environment to map the scene light levels to the display light levels. Additionally, optionally or alternatively, in some embodiments, in response to determining that the scene viewing environment is not the same as the first display viewing environment of the first target display, the first DM operation (308-1) applies a surround compensation curve that takes into consideration the difference between the scene viewing environment and the first display viewing environment to map the scene light levels to the display light levels, in addition to applying the third tone mapping curve (112-3); the third tone mapping curve (112-3) may represent a reference tone mapping curve defined or specified for an assumed scene viewing environment that is different from the (actual) scene viewing environment.

In some embodiments, as illustrated in FIG. 3A, following the first DM operation (308-1) that generates the first display images for the first target display, a camera image signal processor (ISP 312) processes or enhances the first display images to produce enhanced first display images (e.g., with a relatively pleasing image, etc.). In some embodiments, the first display images or the enhanced first display images represent HDR images (314-1).

In some embodiments, the one or more DM operations include a second DM operation (308-2), a third DM operation (308-3), etc., in addition to the first DM operation (308-1). Each of these other DM operations (e.g., 308-2, 308-3) may repeat some or all of the foregoing processing to generate other display images for other target displays.

For example, the second DM operation (308-2) may perform a DM algorithm—which may or may not be the same as the DM algorithm performed by other DM operations—to generate second display images or enhanced second display images specifically adapted (or optimized) for a second target display and a second set of display image metadata for the second display images or the enhanced second display images. In some embodiments, the second target display represents a preview monitor; the second display images or the enhanced second display images represent preview images (314-2).

Likewise, the third DM operation (308-3) may perform a DM algorithm—which may or may not be the same as the DM algorithm performed by other DM operations—to generate third display images or enhanced third display images specifically adapted (or optimized) for a third target display and a third set of display image metadata for the third display images or the enhanced third display images. In some embodiments, the third target display represents an SDR display; the third display images or the enhanced third display images represent SDR images (314-3).

Some or all of (e.g., enhanced, etc.) display images and sets of display image metadata for the display images for one or more target displays may be saved/stored in storage medium, may be transmitted in real time or in non-real time to recipient display devices, may be streamed by a cloud-based server, a content provider, a media streaming system, etc., to downstream devices.

As discussed above, in some embodiments, OOTF-based light level mapping may be supplanted or replaced by DM operations that incorporate tone mapping and/or surround compensations. These DM operations can be performed in a color space such as an LMS color space, an ICtCp color space, etc., with no or little distortions on chromaticities or on hues (e.g., with color saturation changes in connection with the Hunt Effect, etc.).

Additionally, optionally or alternatively, if a tone mapping curve used by the DM operations is defined or specified for an assumed target viewing environment, and if the assumed target viewing environment is different from an actual target viewing environment, ambient light adjustment may be performed before, at the same time as, or after the tone mapping curve defined or specified for the assumed target viewing environment.

Thus, under techniques as described herein, scene-referred (e.g., absolute, human perceptible, etc.) contrasts and chromaticities can be faithfully preserved and conveyed to a reference target viewing environment. Additionally, optionally or alternatively, the scene-referred contrasts and chromaticities can be conveyed to an actual target viewing environment, for example by way of ambient light adjustment to compensate or adjust for the actual target viewing environment. Examples of ambient light adjustment can be found in U.S. patent application Ser. No. 15/298,521, filed on Oct. 20, 2016, which is hereby incorporated herein by reference in its entirety.

For the purpose of illustration only, it has been described that the metadata generator (310) generates the set of scene image metadata, whereas the DM operations (e.g., 308-1 through 308-3) generates the sets of display image metadata. In various embodiments, some or all of sets of scene/display image metadata as described herein may be generated by any combination of one or more of: DM operations (e.g., any, some or all of 308-1 through 308-3, etc.), a metadata generator (e.g., 310, etc.), a dedicated metadata generation block, and the like, operating as a part of the image processing pipeline (300-1).

For example, the metadata generator (310) may be invoked by the image processing pipeline (300-1) to calculate the set of scene image metadata and the sets of display image metadata. The set of scene image metadata—including but not limited to scene characteristics such as the max scene luminance, the min scene luminance, the mid scene luminance, etc., of the scene images—can be calculated from the absolute scene pixel values, which may be derived from the relative scene pixel values based in part on the exposure setting data from the exposure meter (302). The sets of display image metadata are respectively adjusted from the set of scene image metadata for the target displays. Each set of display image metadata in the sets of display image metadata may be calculated by applying a corresponding tone mapping curve to the set of scene image metadata. The max scene luminance, the mid scene luminance, the min scene luminance, etc., in the set of scene image metadata may be adjusted by the tone mapping curve into a max display luminance, a mid display luminance, a min display luminance, etc., in the set of display image metadata. In some embodiments, the set of display image metadata can be stored, transmitted, streamed, etc., with display images adapted by the tone mapping curve from the scene images. Downstream client devices (e.g., displays, display devices, mobile computing devices, media players, etc.) can receive the display images and the set of display image metadata, and optionally perform further adaptation based on display capabilities of the downstream client devices, the display images and the set of display image metadata. The further adapted display images may be rendered on displays of the downstream client devices.

Figure 3B:
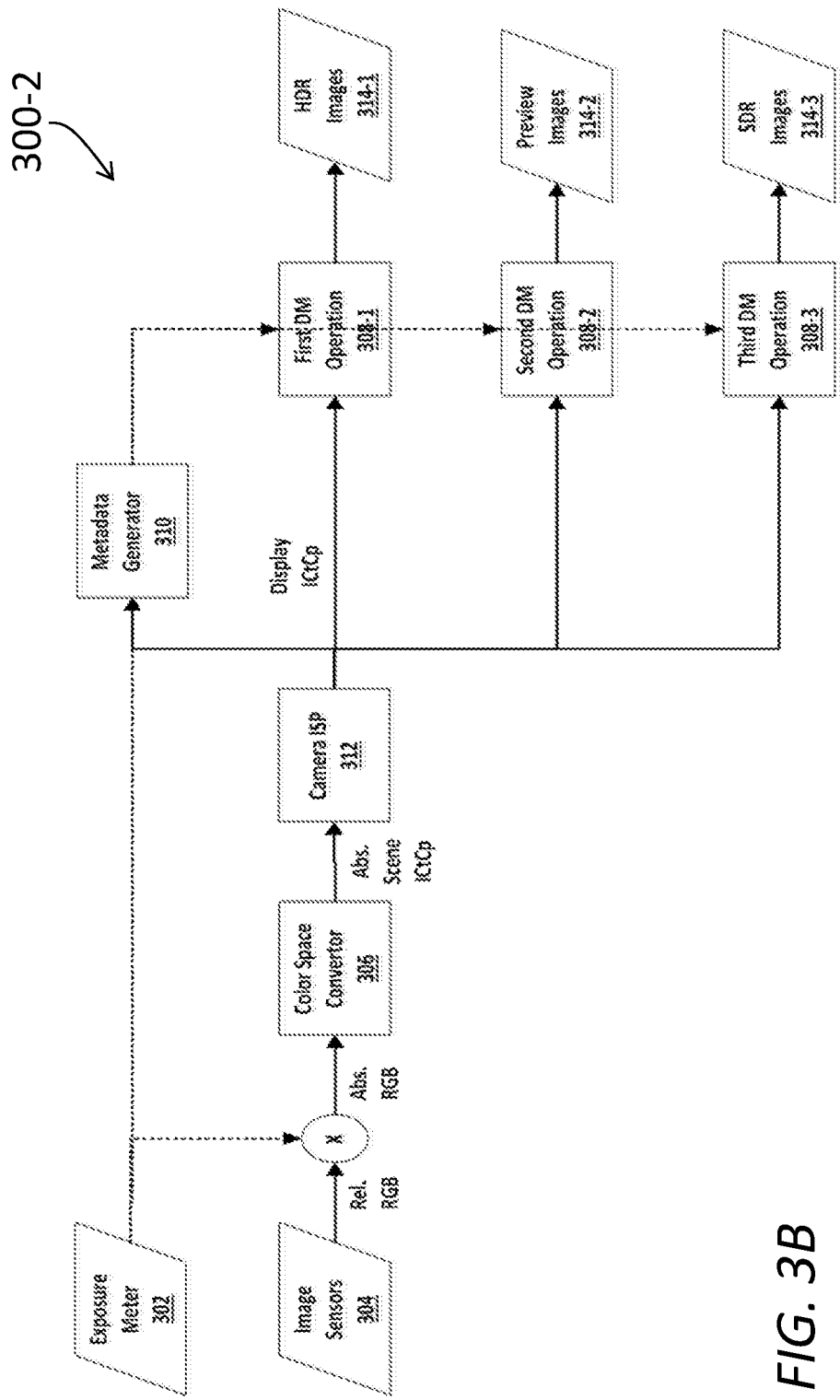

FIG. 3B illustrates an example image processing pipeline 300-2 that DM operations perform OOTF like adaptive operations. Some or all of the image processing pipeline (300-2) may be implemented with one or more computing devices such as a camera system, a computing device operating in conjunction with a camera system, a production studio system, a media broadcast system, a media streaming system, a cloud-based system, a VR system, an AR system, a remote presence system, an automobile entertainment system, etc.

As compared with the image processing pipeline (300-1) of FIG. 3A, the image processing pipeline (300-2) swaps the order of the camera ISP (312) and the first DM operation (308-1). As used herein, a camera ISP refers to a computing device/block that performs preliminary image processing operations on a camera image signal (e.g., a raw image signal, image sensor data, etc.) such as auto focus, image sharpening, white balancing, corrections (skin tones), bad pixel corrections, etc. The preliminary image processing operations performed by the camera ISP (312) may affect probabilistic distributions of scene light levels, chromaticities, etc.

As illustrated in FIG. 3B, the metadata generator (310) and/or the one or more DM operations (308-1 through 308-3) in the image processing pipeline (300-2) can generate the set of scene image metadata and the sets of display image metadata, after the preliminary image processing operations are performed before the metadata generator (310) and/or before the one or more DM operations (308-1 through 308-3). The set of scene image metadata and the sets of display image metadata are generated in the image processing pipeline (300-2) based on distributions of the same scene pixel values that are to be further adapted or mapped into the display pixel values. Thus, the set of scene image metadata and the sets of display image metadata generated in the image processing pipeline (300-2) can be relatively accurate as compared with those generated in the image processing pipeline (300-1). Otherwise, in order to increase or ensure accuracies in the set of scene image metadata and the sets of display image metadata, the metadata generator (310) and/or the one or more DM operations (308-1 through 308-3) in the image processing pipeline (300-1) would need to make additional adjustments or re-computations after the camera ISP (312) in the image processing pipeline (300-1) is performed.

10. PERFORMING OOTF IN ADDITION TO DISPLAY MANAGEMENT

Figure 3C:
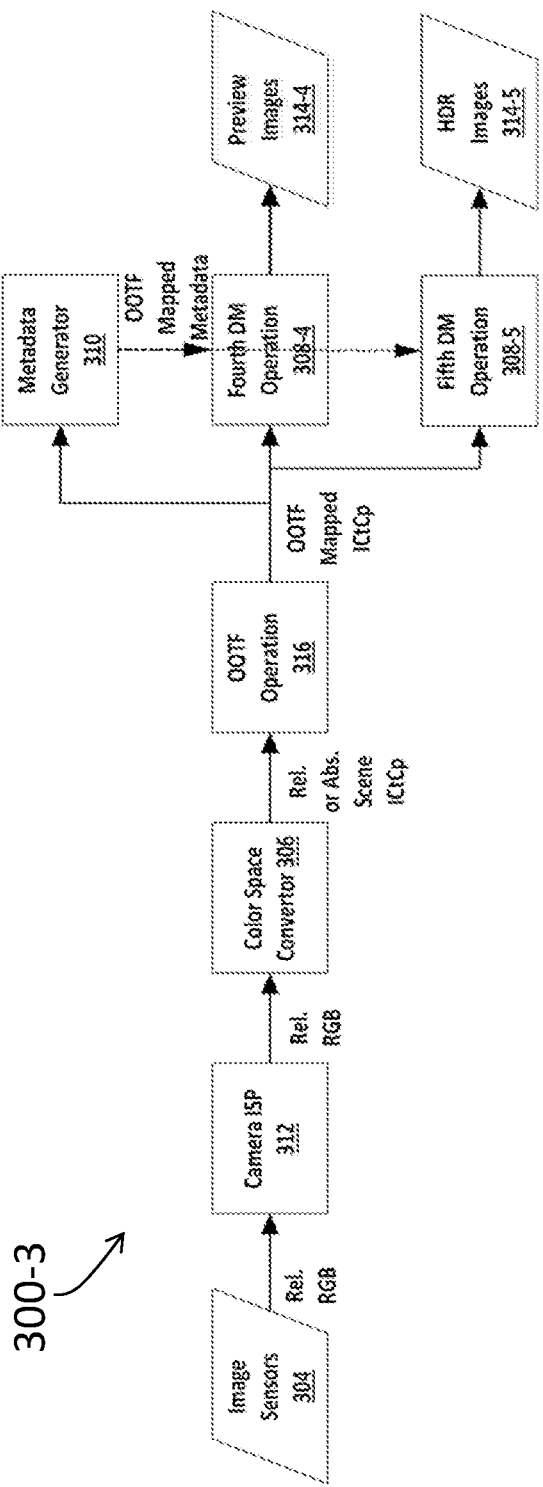

FIG. 3C illustrates an example image processing pipeline 300-3. Some or all of the image processing pipeline (300-3) may be implemented with one or more computing devices such as a camera system, a computing device operating in conjunction with a camera system, a production studio system, a media broadcast system, a media streaming system, a cloud-based system, a VR system, an AR system, a remote presence system, an automobile entertainment system, etc.

In some embodiments, as illustrated in the image processing pipeline (300-3) of FIG. 3C, DM operations supplement OOTF-based light level mapping. In these embodiments, the OOTF-based light level mapping is performed in addition to the DM operations. For example, the OOTF-based light level mapping may be separately performed before the DM operations. As used herein, the term "OOTF-based light level mapping" refers to applying an OOTF to adapt or remap scene light levels (e.g., normalized light exposures) into mapped light levels.

In some embodiments, the camera ISP (312) in the image processing pipeline (300-3) processes or enhances the scene images to produce enhanced scene images (e.g., with a relatively pleasing image, etc.) that comprise enhanced relative R, G and B values. For simplicity reason, "the enhanced scene images" and "the enhanced relative R, G and B values" may be hereinafter referred to as "the scene images" and "the relative R, G and B values," respectively.

In some embodiments, the image processing pipeline (300-3) does not compute absolute (linear)R, G and B values with a normalization/scaling factor such as $\beta$. Relative R, G and B values—rather than absolute R, G and B values—in scene images as captured by the one or more image sensors (304) from an original scene may be directly used in some or all of the subsequent image processing operations in the image processing pipeline (300-3).

In some embodiments, the input color space convertor (306) in the image processing pipeline (300-3) converts the relative R, G and B values that represent the scene images acquired/captured from the original scene to corresponding relative PQ codewords (denoted as "Rel. or Abs. scene ICtCp") in an ICtCp color space.

Additionally, optionally or alternatively, in some other embodiments, the input color space convertor (306) computes absolute (linear)R, G and B values with a normalization/scaling factor such as β (e.g., a default factor that equals a relative value 1.0 to 100 nits, etc.). The absolute R, G and B values may be used to derive absolute PQ codewords (denoted as "Rel. or Abs. scene ICtCp") in an ICtCp color space.

In some embodiments, an OOTF operation 316 in the image processing pipeline (300-3) remaps absolute or relative scene light levels of the original scene as represented by the relative or absolute PQ codewords in the I component in the ICtCp color space to corresponding OOTF mapped light levels of OOTF mapped images (denoted as "OOTF mapped ICtCp"), based on an OOTF and expressions (5) through (8). The OOTF mapped images comprise absolute OOTF mapped pixels including but not limited to the OOTF mapped light levels.

The OOTF may be a light level mapping curve defined or specified for a reference display viewing environment (e.g., in ITU-BT.2100 Specification, etc.), or an OOTF adapted by interpolation, by surround compensations, etc. In some embodiments, the OOTF expects relative linear light levels (normalized camera exposure) as input. In the embodiments in which the PQ codewords in the I component in the ICtCp color space are absolute values, to remap the absolute scene light levels of the original scene as represented by the absolute PQ codewords in the I component in the ICtCp color space to the corresponding OOTF mapped light levels of OOTF mapped images ("OOTF mapped ICtCp"), the OOTF operation (316) first converts the PQ codewords in the I component in the ICtCp color space to absolute linear scene light levels (e.g., by a PQ2L conversion function as shown in expression (6), etc.) and then scales the absolute linear scene light levels of the original scene with the normalization/scaling factor β (e.g., the default factor that equals a relative value 1.0 to 100 nits, etc.).

In some embodiments, the metadata generator (310) generates a set of OOTF mapped image metadata. The metadata generator (310) determines or estimates a range of OOTF mapped light levels, which may be included in the set of OOTF mapped image metadata (denoted as "OOTF mapped metadata").

The range of OOTF mapped light levels may refer to, without limitation, an entire range of OOTF mapped light levels, a substantial part in an entire range of OOTF mapped light levels, a range of OOTF mapped light levels with a max OOTF mapped luminance set to the maximum light and/or a min OOTF mapped luminance set to the minimum light level for a certain percentile (e.g., 90%, 95%, etc.) of all OOTF mapped pixels, etc. In some embodiments, the range of OOTF mapped light levels in the OOTF mapped images may be determined based on (a distribution of) OOTF mapped pixel values in the I component of the ICtCp color space.

In some embodiments, the image processing pipeline (300-3) performs one or more DM operations 308-4 and 308-5 on the OOTF mapped images as represented by the PQ codewords in the ICtCp color space to generate display images for one or more target displays (or target display devices). Each of the one or more target displays may represent a display type with corresponding display capabilities specific to the display type.

For example, a fourth DM operation (308-4) may implement and perform a DM algorithm that takes the OOTF mapped images in the ICtCp color space, the set of OOTF mapped image metadata, a fourth display environment light level representing a fourth display viewing environment of a fourth target display, etc., as inputs. By way of example but not limitation, the fourth target display may be a preview monitor of the camera system that captures the scene images from the original scene.

Based on some or all of the foregoing inputs, the fourth DM operation (308-4) performs the DM algorithm to generate corresponding fourth display images specifically adapted (or optimized) for the fourth target display. Additionally, optionally or alternatively, based on some or all of the inputs to the DM algorithm and the fourth display images, the fourth DM operation (308-4) performs the DM algorithm to generate a fourth set of display image metadata for the fourth display images. In operational scenarios in which the fourth target display is the preview monitor of the camera system, the fourth display images may be directly rendered as preview images 314-4 on the preview monitor.

Additionally, optionally or alternatively, appropriate surround compensations (or adjustments) for a scene viewing environment in the original scene in relation to an assumed scene viewing environment of the OOTF can be determined by comparing the scene environment light level representing the scene viewing environment and an assumed environment light level of the assumed scene viewing environment and applied in addition to or as a part of the OOTF-based light level mapping.

In some embodiments, if a tone mapping curve used by the DM operations is defined or specified for an assumed target viewing environment, and if the assumed target viewing environment is different from an actual target viewing environment, ambient light adjustment may be performed as a part of generating the fourth display images before, at the same time as, or after the tone mapping curve defined or specified for the assumed target viewing environment.

In some embodiments, each of the fourth display images may be represented by a plurality of sets of display pixel values for a plurality of display pixels that form a spatial shape such as rectangular shapes, oval shapes, circular shapes, heart shapes, spherical shapes, regular shapes, irregular shapes, a combination of any of the foregoing, etc. In some embodiments, each set of display pixel values in the plurality of sets of display pixel values comprises a set of relative I, T and P display pixel values in the ICtCp color space for a corresponding display pixel in the display image. Additionally, optionally or alternatively, the fourth display images may be converted into a different output color space (e.g., RGB color space, YCbCr color space, LMS color space, XYZ color space, IPT color space, etc.) other than the ICtCp color space before being outputted to storage media, downstream devices, streaming clients, media players, etc.

In some embodiments, the one or more DM operations include a fifth DM operation (308-5), etc., in addition to the fourth DM operation (308-4). Each of these other DM operations (e.g., 308-5, etc.) may repeat some or all of the foregoing processing to generate other display images for other target displays.

For example, the fifth DM operation (308-5) may perform a DM algorithm—which may or may not be the same as the DM algorithm performed by other DM operations—to generate fifth display images specifically adapted (or optimized) for a fifth target display and a fifth set of display image metadata for the fifth display images. In some embodiments, the fifth target display represents an HDR display; the fifth display images represent HDR images (314-5).

Some or all of (e.g., enhanced, etc.) display images and sets of display image metadata for the display images for one or more target displays may be saved/stored in storage medium, may be transmitted in real time or in non-real time to recipient display devices, may be streamed by a cloud-based server, a content provider, a media streaming system, etc., to downstream devices.

Figure 3D:
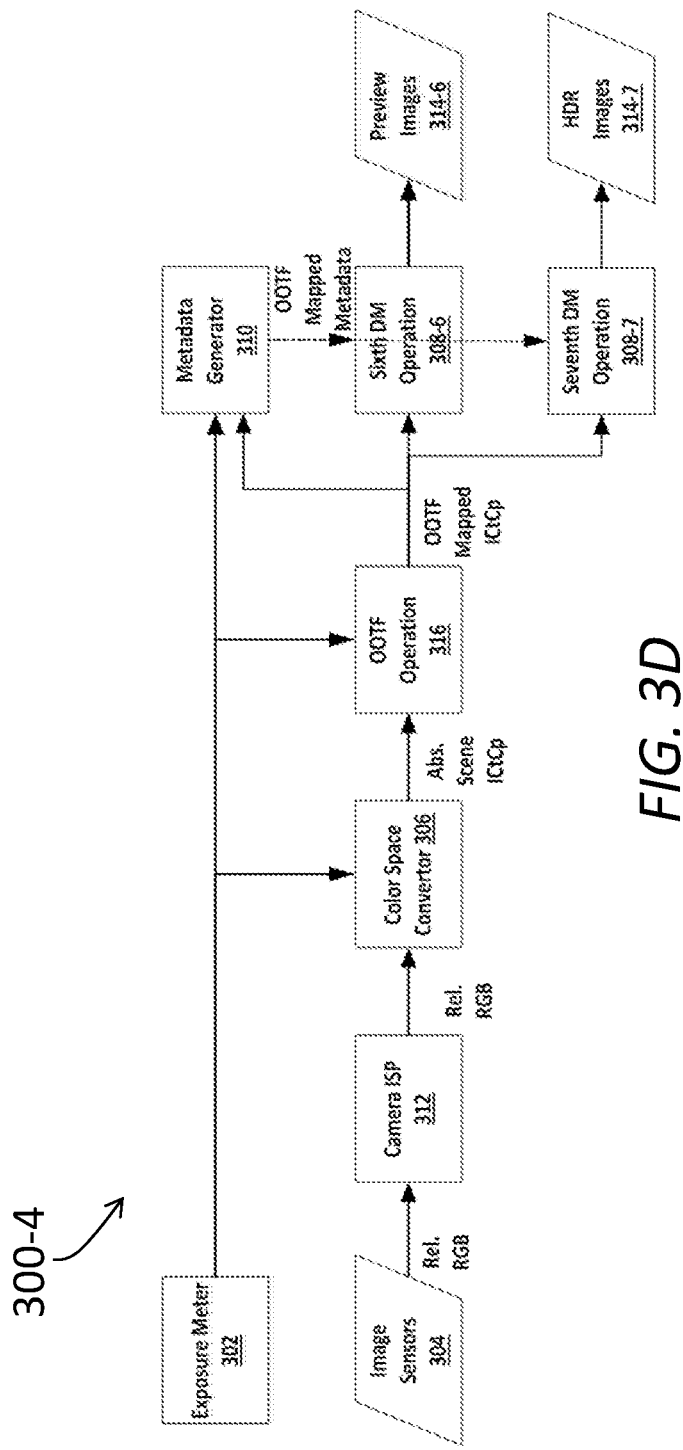

FIG. 3D illustrates an example image processing pipeline 300-4. Some or all of the image processing pipeline (300-4) may be implemented with one or more computing devices such as a camera system, a computing device operating in conjunction with a camera system, a production studio system, a media broadcast system, a media streaming system, a cloud-based system, a VR system, an AR system, a remote presence system, an automobile entertainment system, etc.

In some embodiments, as illustrated in the image processing pipeline (300-4) of FIG. 3D, DM operations supplement OOTF-based light level mapping. In these embodiments, the OOTF-based light level mapping is performed in addition to the DM operations. For example, the OOTF-based light level mapping may be separately performed before the DM operations.

In some embodiments, the image processing pipeline (300-4), for example the color space convertor (306) therein, computes absolute (linear)R, G and B values with a normalization/scaling factor such as β as determined from exposure setting data received from the exposure meter (302). The absolute R, G and B values in scene images as captured by the one or more image sensors (304) from an original scene may be used to derive PQ codewords (denoted as "Abs. scene ICtCp") in an ICtCp color space. The PQ codewords in the ICtCp color space may be directly used in some or all of the subsequent image processing operations in the image processing pipeline (300-4).

In some embodiments, the OOTF operation (316) in the image processing pipeline (300-4) remaps absolute scene light levels of the original scene as represented by PQ codewords in the I component in the ICtCp color space to corresponding OOTF mapped light levels of OOTF mapped images (denoted as "OOTF mapped ICtCp"), based on an OOTF and expressions (5) through (8). The OOTF mapped images comprise absolute OOTF mapped pixels including but not limited to the OOTF mapped light levels.

The OOTF may be a light level mapping curve defined or specified for a reference display viewing environment (e.g., in ITU-BT.2100 Specification, etc.), or an OOTF adapted by interpolation, by surround compensations, etc. In some embodiments, the OOTF expects relative linear light levels (normalized camera exposure) as input. To remap the absolute scene light levels of the original scene as represented by PQ codewords in the I component in the ICtCp color space to the corresponding OOTF mapped light levels of OOTF mapped images ("OOTF mapped ICtCp"), the OOTF operation (316) first converts the PQ codewords in the I component in the ICtCp color space to absolute linear scene light levels (e.g., by a PQ2L conversion function as shown in expression (6), etc.) and then scales the absolute linear scene light levels of the original scene with the normalization/scaling factor such as β as determined from exposure setting data received from the exposure meter (302).

In some embodiments, the metadata generator (310) generates a set of OOTF mapped image metadata. The metadata generator (310) determines or estimates a range of OOTF mapped light levels, which may be included in the set of OOTF mapped image metadata (denoted as "OOTF mapped metadata").

The range of OOTF mapped light levels may refer to, without limitation, an entire range of OOTF mapped light levels, a substantial part in an entire range of OOTF mapped light levels, a range of OOTF mapped light levels with a max OOTF mapped luminance set to the maximum light and/or a min OOTF mapped luminance set to the minimum light level for a certain percentile (e.g., 90%, 95%, etc.) of all OOTF mapped pixels, etc. In some embodiments, the range of OOTF mapped light levels in the OOTF mapped images may be determined based on (a distribution of) OOTF mapped pixel values in the I component of the ICtCp color space.

In some embodiments, the image processing pipeline (300-4) performs one or more DM operations 308-6 and 308-7 on the OOTF mapped images as represented by the PQ codewords in the ICtCp color space to generate display images for one or more target displays (or target display devices). Each of the one or more target displays may represent a display type with corresponding display capabilities specific to the display type.

For example, a sixth DM operation (308-6) may implement and perform a DM algorithm that takes the OOTF mapped images in the ICtCp color space, the set of OOTF mapped image metadata, a scene environment light level (e.g., derived based on the exposure setting data from the exposure meter (302), derived from ambient light sensors, derived from a device/block that determines or estimates a light adaptation level, etc.) representing the scene viewing environment of the original scene, a sixth display environment light level representing a sixth display viewing environment of a fourth target display, etc., as inputs. By way of example but not limitation, the sixth target display may be a preview monitor of the camera system that captures the scene images from the original scene.

Based on some or all of the foregoing inputs, the sixth DM operation (308-6) performs the DM algorithm to generate corresponding fourth display images specifically adapted (or optimized) for the sixth target display. Additionally, optionally or alternatively, based on some or all of the inputs to the DM algorithm and the sixth display images, the sixth DM operation (308-6) performs the DM algorithm to generate a sixth set of display image metadata for the sixth display images. In operational scenarios in which the sixth target display is the preview monitor of the camera system, the sixth display images may be directly rendered as preview images 314-6 on the preview monitor.

Additionally, optionally or alternatively, appropriate surround compensations (or adjustments) for a scene viewing environment in the original scene in relation to an assumed scene viewing environment of the OOTF can be determined by comparing the scene environment light level representing the scene viewing environment and an assumed environment light level of the assumed scene viewing environment and applied in addition to or as a part of the OOTF-based light level mapping.

In some embodiments, (a) if a tone mapping curve used by the DM operations is defined or specified for an assumed target viewing environment, and (b) if the assumed target viewing environment is different from an actual target viewing environment, then ambient light adjustment may be performed as a part of generating the sixth display images before, at the same time as, or after the tone mapping curve defined or specified for the assumed target viewing environment.

In some embodiments, each of the sixth display images may be represented by a plurality of sets of display pixel values for a plurality of display pixels that form a spatial shape such as rectangular shapes, oval shapes, circular shapes, heart shapes, spherical shapes, regular shapes, irregular shapes, a combination of any of the foregoing, etc. In some embodiments, each set of display pixel values in the plurality of sets of display pixel values comprises a set of relative I, T and P display pixel values in the ICtCp color space for a corresponding display pixel in the display image. Additionally, optionally or alternatively, the sixth display images may be converted into a different output color space (e.g., RGB color space, YCbCr color space, LMS color space, XYZ color space, IPT color space, etc.) other than the ICtCp color space before being outputted to storage media, downstream devices, streaming clients, media players, etc.

In some embodiments, the one or more DM operations include a seventh DM operation (308-7), etc., in addition to the sixth DM operation (308-6). Each of these other DM operations (e.g., 308-7, etc.) may repeat some or all of the foregoing processing to generate other display images for other target displays.

For example, the seventh DM operation (308-7) may perform a DM algorithm—which may or may not be the same as the DM algorithm performed by other DM operations—to generate seventh display images specifically adapted (or optimized) for a seventh target display and a seventh set of display image metadata for the seventh display images. In some embodiments, the seventh target display represents an HDR display; the seventh display images represent HDR images (314-7).

Some or all of (e.g., enhanced, etc.) display images and sets of display image metadata for the display images for one or more target displays may be saved/stored in storage medium, may be transmitted in real time or in non-real time to recipient display devices, may be streamed by a cloud-based server, a content provider, a media streaming system, etc., to downstream devices.

As discussed above, in some embodiments, OOTF-based light level mapping may be supplemented by DM operations that incorporate tone mapping and/or surround compensations. The OOTF-based light level mapping operations can be performed in a color space based on expressions (3) through (8) with no or little distortions on chromaticities or on hues (e.g., with color saturation changes in connection with the Hunt Effect, etc.).

Thus, under techniques as described herein, scene-referred (e.g., absolute, human perceptible, etc.) contrasts and chromaticities can be faithfully preserved and conveyed to a reference target viewing environment. Additionally, optionally or alternatively, the scene-referred contrasts and chromaticities can be conveyed to an actual target viewing environment, for example by way of ambient light adjustment to compensate or adjust for the actual target viewing environment.

For the purpose of illustration only, it has been described that some operations are performed on linear pixel values, whereas some operations are performed on non-linear pixel values such as PQ codewords. It should be noted, however, that in various embodiments, techniques as described herein can be used or extended to implement or perform like operations on any of linear pixel values, non-linear pixel values, PQ codewords, gamma based values, and the like. For example, in some embodiments, a linear-to-gamma or a gamma-to-linear conversion function may be performed in addition to or instead of a linear-to-PQ (L2PQ) or a PQ-to-linear (PQ2L) conversion function.

For the purpose of illustration only, it has been described that some operations are performed on pixel values represented in a first color space, whereas some operations are performed on pixel values represented in a second different color space, etc. It should be noted, however, that in various embodiments, some or all of techniques as described herein can be used or extended to implement or perform like operations on pixel values represented in any of RGB color spaces, YCbCr color spaces, IPT color spaces, XYZ color spaces, LMS color spaces, ITP or ICtCp color spaces, and the like. For example, instead of performing OOTF-based light level mapping in an ICtCp color space based on expressions (5) through (7), the OOTF-based light level mapping may be performed in an LMS color space based on expressions (3) and (4), or another color space based on modified expressions generated by combining color space conversion matrices with any, some or all of expressions (3) through (7).

For the purpose of illustration only, it has been described that operations can be performed with components, blocks, devices, etc., in the image processing pipelines (300-1 through 300-4). It should be noted, however, that in various embodiments, fewer or more operations may be used or performed in an image processing pipeline as described herein. Additionally, optionally or alternatively, some or all of techniques as described herein can be performed by a different combination/order of components, blocks, devices, etc., in these and other image processing pipelines.

In an embodiment, the proposed operations may be further enhanced by using edge-preserved filtering, like unsharp masking, and the like. An example of applying such filtering in the ICtCp color space may be found in PCT Application PCT/US2016/013352, "Display management for High Dynamic Range video," filed on Jan. 14, 2016, published as WO 2016/118395, which is incorporated herein by reference in its entirety.

11. EXAMPLE PROCESS FLOWS

Figure 4A:
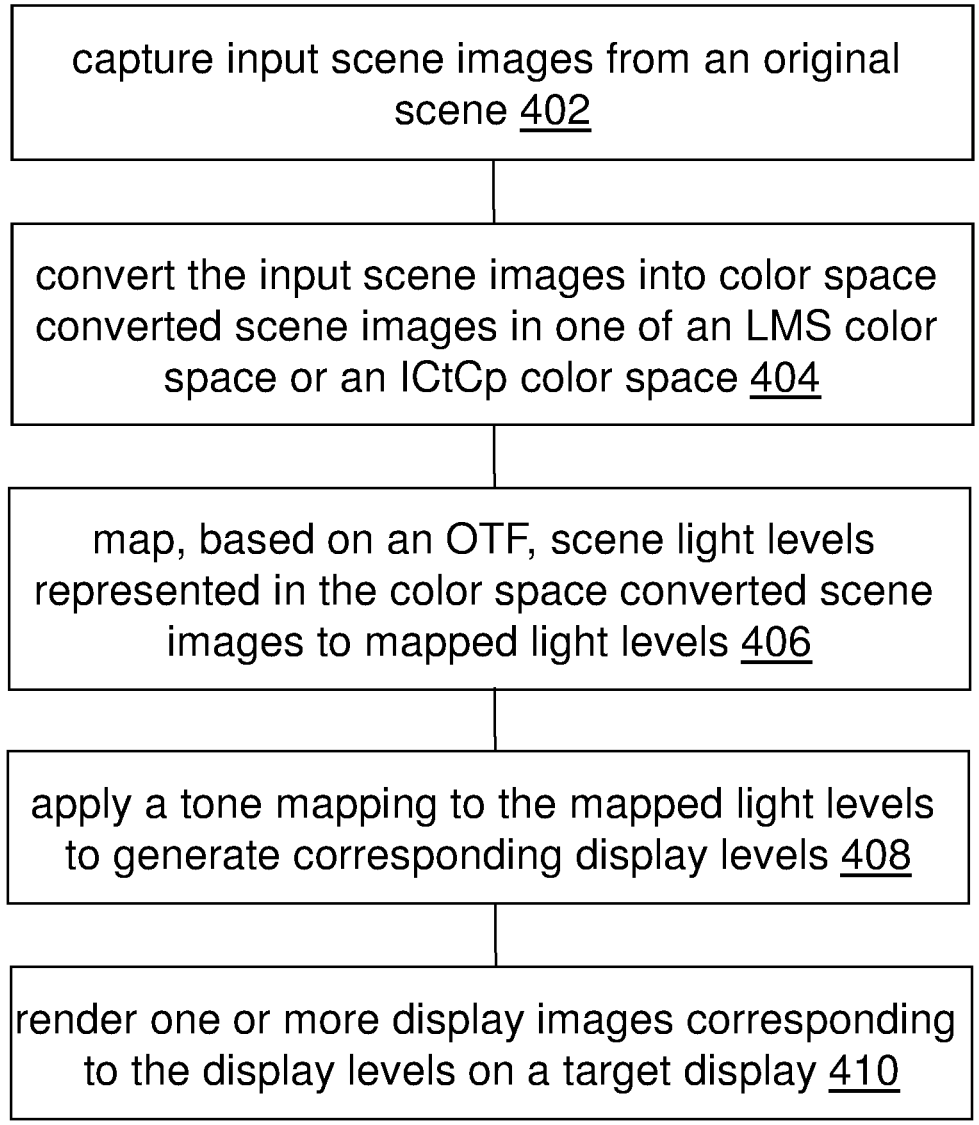

FIG. 4A illustrates an example process flow according to an example embodiment of the present invention. In some example embodiments, one or more computing devices or components may perform this process flow. In block 402, an image processing pipeline (e.g., as illustrated in one of FIG. 3A through FIG. 3D, etc.) captures one or more input scene images from an original scene, the one or more input scene images being represented in an input color space.

In block 404, the image processing pipeline converts the one or more input scene images into one or more color-space-converted scene images in one of an LMS color space or an ICtCp color space.

In block 406, the image processing pipeline remaps, based at least in part on an optical transfer function, scene light levels represented in the one or more color-space-converted scene images in the one of the LMS color space or the ICtCp color space to mapped light levels.

In block 408, the image processing pipeline applies a tone mapping to the mapped light levels to generate corresponding display light levels to be represented in one or more display images.

In optional block 410, the image processing pipeline causes the one or more display images to be rendered on a target display.

In an embodiment, the optical transfer function represents a mapping curve derived by adjusting a reference optical transfer function with a surround compensation based on a scene viewing environment of the original scene that is different from a reference scene viewing environment associated with the reference optical transfer function.

In an embodiment, the optical transfer function represents a reference optical transfer function associated with a reference scene viewing environment that is different from a scene viewing environment of the original scene; the image processing pipeline is further configured to apply a surround compensation in mapping scene light levels represented in the one or more color-space-converted scene images to mapped light levels in addition to applying the optical transfer function.

In an embodiment, the tone mapping represents a reference tone mapping curve associated with a reference display viewing environment that is different from an actual display viewing environment of the target display; the image processing pipeline is further configured to apply an ambient light adjustment in applying the tone mapping to the mapped light levels to generate the corresponding display light levels to be represented in one or more display images.

FIG. 4B illustrates an example process flow according to an example embodiment of the present invention. In some example embodiments, one or more computing devices or components may perform this process flow. In block 412, an image processing pipeline (e.g., as illustrated in one of FIG. 3A through FIG. 3D, etc.) converts a set of scene pixel values for a scene pixel in a scene image captured from an original scene into a set of L, M and S scene pixel values represented in an LMS color space for the scene pixel, the set of scene pixel values being represented in an input color space.

In block 414, the image processing pipeline derives a scene light level for the scene pixel based on the set of L, M and S scene pixel values for the scene pixel.

In block 416, the image processing pipeline remaps, based at least in part on an optical transfer function, the scene light level to a mapped light level of the scene pixel.

In block 418, the image processing pipeline applies a common ratio to each of the L, M and S scene pixel values in the set of L, M and S scene pixel values for the scene pixel to generate a set of mapped L, M and S scene pixel values for the scene pixel, the common ratio being computed from the scene light level and the mapped light level.

In optional block 420, the image processing pipeline causes a display image to be rendered on a target display, the display image including a display pixel for which a set of display pixel values is derived from the set of mapped L, M and S scene pixel values.

In an embodiment, the scene image comprises a plurality of sets of scene pixel values for a plurality of scene pixels of the scene image; each set of scene pixel values in the plurality of sets of scene pixel values corresponds to a respective scene pixel in the plurality of scene pixels; the image processing pipeline is further configured to repeat the foregoing blocks for each set of scene pixel values in the plurality of sets of scene pixel values to generate a plurality of sets of display pixel values to be included in the display image.

In an embodiment, the optical transfer function represents one of an optical-to-optical transfer function (OOTF), an optical-to-electric transfer function (OETF), an inverse electric-to-optical transfer function (inverse EOTF), or another optical transfer function.

FIG. 4C illustrates an example process flow according to an example embodiment of the present invention. In some example embodiments, one or more computing devices or components may perform this process flow. In block 422, an image processing pipeline (e.g., as illustrated in one of FIG. 3A through FIG. 3D, etc.) converts a set of scene pixel values for a scene pixel in a scene image captured from an original scene into a set of I, T and P scene pixel values represented in an ICtCp color space for the scene pixel, the set of scene pixel values being represented in an input color space.

In block 424, the image processing pipeline remaps, based at least in part on an optical transfer function, an I scene pixel value in the set of I, T and P scene pixel values to a mapped I scene pixel value.

In optional block 426, the image processing pipeline causes a display image to be rendered on a target display, the display image including a display pixel for which a set of display pixel values includes the mapped I scene pixel value. Optionally, the display pixel of the display image further includes T and P scene pixel values in the set of I, T and P scene pixel values for the scene pixel.

In an embodiment, the scene image comprises a plurality of sets of scene pixel values for a plurality of scene pixels of the scene image; each set of scene pixel values in the plurality of sets of scene pixel values corresponds to a respective scene pixel in the plurality of scene pixels; the image processing pipeline is further configured to repeat the foregoing blocks for each set of scene pixel values in the plurality of sets of scene pixel values to generate a plurality of sets of display pixel values to be included in the display image.

Figure 4D:
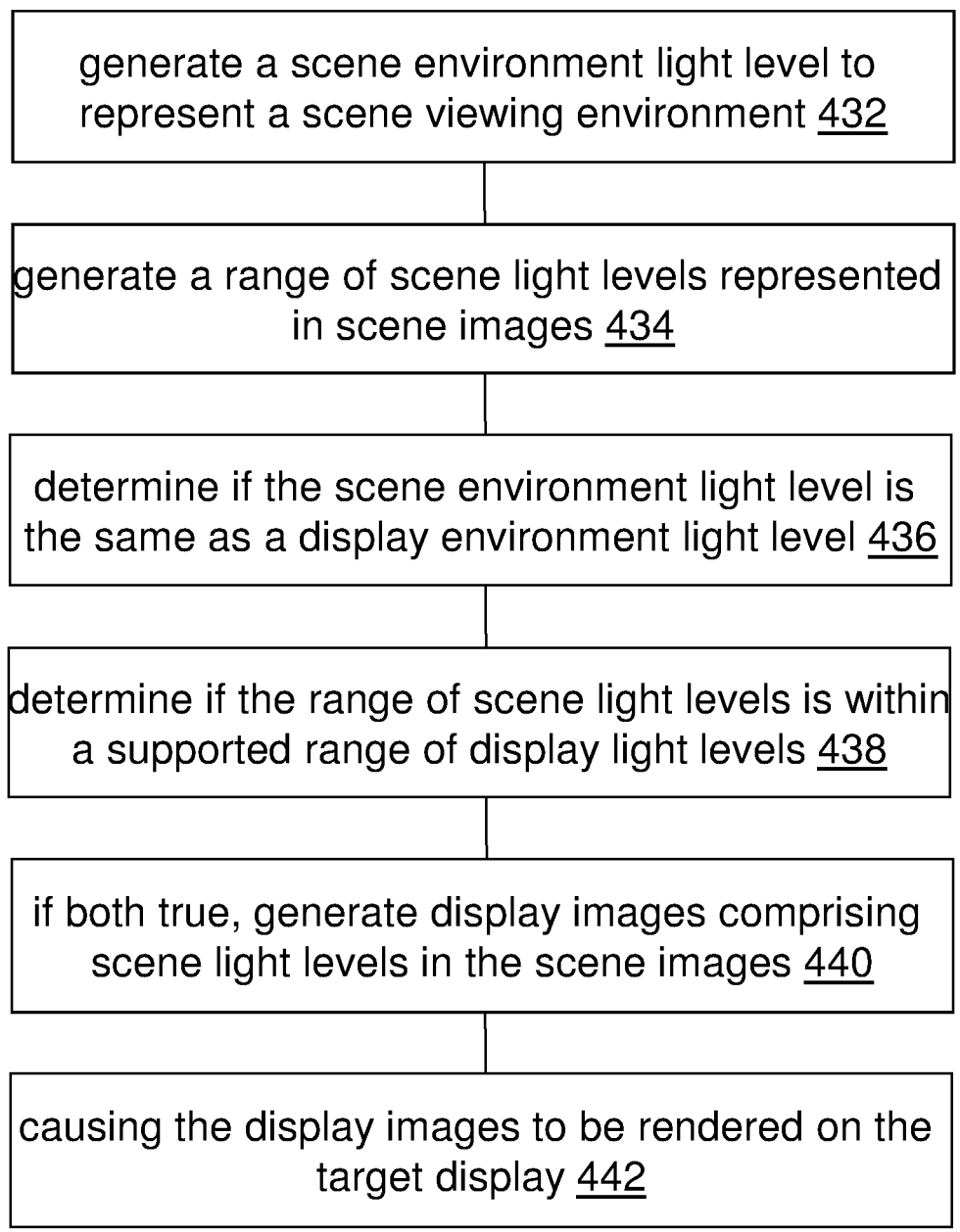
Figure 4E:
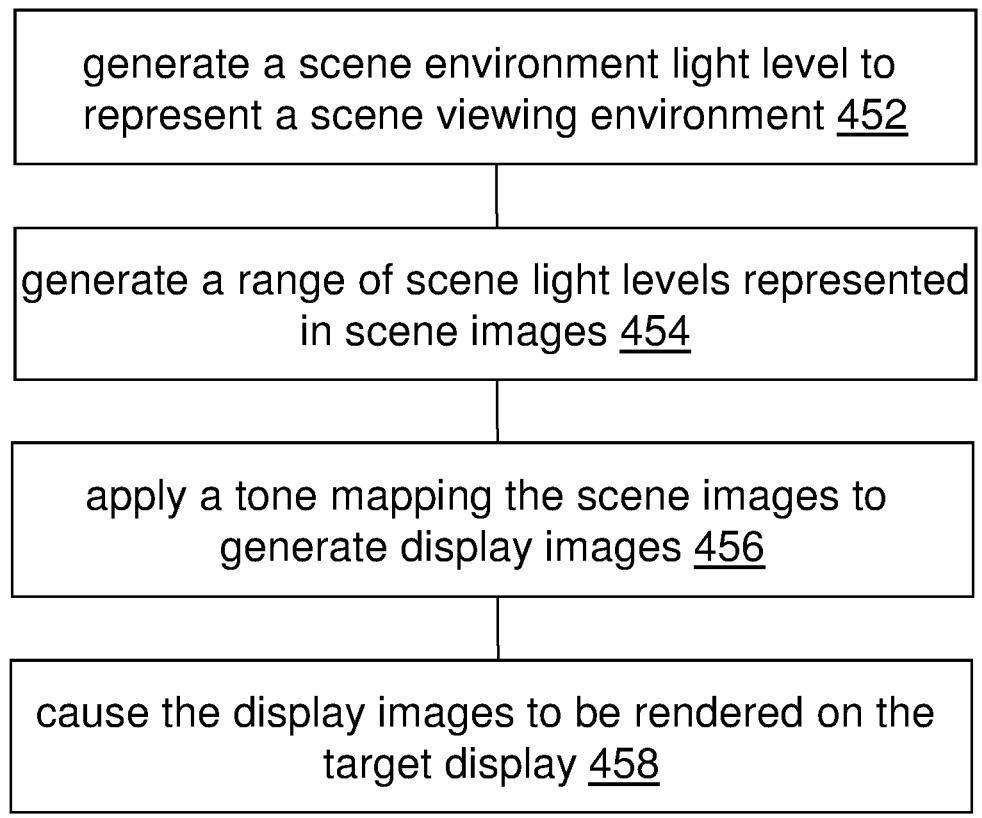

FIG. 4D illustrates an example process flow according to an example embodiment of the present invention. In some example embodiments, one or more computing devices or components may perform this process flow. In block 432, an image processing pipeline (e.g., as illustrated in one of FIG. 3A through FIG. 3D, etc.) generates a scene environment light level to represent a scene viewing environment of an original scene from which one or more scene images are captured.

In block 434, the image processing pipeline generates a range of scene light levels represented in the one or more scene images of the original scene.

In block 436, the image processing pipeline determines whether the scene environment light level is same as a display environment light level that represents a display viewing environment of a target display.

In block 438, the image processing pipeline determines whether the range of scene light levels is within a supported range of display light levels supported by the target display.

In block 440, the image processing pipeline, in response to determining that the scene environment light level is same as a display environment light level that represents a display viewing environment of a target display and that the range of scene light levels is within a supported range of display light levels supported by the target display, generates one or more display images comprising display light levels that are identical to corresponding scene light levels in the one or more scene images.

In optional block 442, the image processing pipeline causes the one or more display images to be rendered on the target display.

In an embodiment, the image processing pipeline is further configured to perform: in response to determining that the scene environment light level is not same as the display environment light level or that the range of scene light levels is not within a supported range of display light levels supported by the target display, mapping, based at least in part on an optical transfer function, the scene light levels to mapped light levels, the mapped light levels being used to derive the display light levels to be represented in the one or more display images.

In an embodiment, the optical transfer function is derived by interpolation of two fixed optical transfer functions based on an interpolation factor that is dependent on the scene environment light level.

In an embodiment, the optical transfer function is selected from among a plurality of optical transfer functions based on the scene environment light level; the plurality of optical transfer functions corresponds to a plurality of different possible scene environment light levels.

In an embodiment, the optical transfer function represents a reference transfer function associated with a reference scene viewing environment that is different from the scene viewing environment of the original scene; the image processing pipeline is further configured to apply, based on the scene viewing environment of the original scene, a surround compensation in mapping the scene light levels to the mapped light levels in addition to applying the optical transfer function.

In an embodiment, the optical transfer function represents a reference optical transfer function associated with a reference scene viewing environment that is different from the scene viewing environment of the original scene; the image processing pipeline is further configured to apply a tone mapping to the mapped light levels to generate the display light levels to be represented in the one or more display images in addition to applying the optical transfer function.

In an embodiment, the tone mapping represents a reference tone mapping associated with a reference display viewing environment that is different from an actual display viewing environment of the target display; the image processing pipeline is further configured to apply an ambient light adjustment in applying the tone mapping to the mapped light levels to generate the display light levels to be represented in one or more display images.

FIG. 4D illustrates an example process flow according to an example embodiment of the present invention. In some example embodiments, one or more computing devices or components may perform this process flow. In block 452, an image processing pipeline (e.g., as illustrated in one of FIG. 3A through FIG. 3D, etc.) generates a scene environment light level to represent a scene viewing environment of an original scene from which one or more scene images are captured.

In block 454, the image processing pipeline generates a range of scene light levels represented in the one or more scene images of the original scene.

In block 456, the image processing pipeline applies a tone mapping to scene pixel values in the one or more scene images of the original scene to generate corresponding display pixel values in one or more display images.

In optional block 458, the image processing pipeline causes the one or more display images to be rendered on the target display.

In an embodiment, the tone mapping supplants optical-to-optical-transfer-function (OOTF) based light level mapping.

In an embodiment, the tone mapping is selected from among a plurality of tone mappings based on the scene environment light level; the plurality of tone mappings corresponds to a plurality of different possible scene environment light levels.

In an embodiment, the tone mapping represents a reference tone mapping associated with an assumed scene viewing environment that is different from the scene viewing environment of the original scene; the image processing pipeline is further configured to apply, based on the scene viewing environment of the original scene, a surround compensation in mapping the scene light levels to the mapped light levels in addition to applying the tone mapping.

In an embodiment, the tone mapping represents a reference tone mapping associated with a reference display viewing environment that is different from an actual display viewing environment of the target display; the image processing pipeline is further configured to apply an ambient light adjustment in applying the tone mapping to the mapped light levels to generate the display light levels to be represented in one or more display images.

In an embodiment, the one or more display images are a part of a time sequence of display images; the time sequence of display images is encoded in one or more of: video streams or video files.

In an embodiment, the image processing pipeline is further configured to apply one or more camera image signal processing (ISP) operations on the one or more scene images before one or more display management (DM) operations.

In an embodiment, the image processing pipeline is further configured to apply one or more camera image signal processing (ISP) operations on the one or more scene images after one or more display management (DM) operations.

In an embodiment, the image processing pipeline is further configured to generate a set of display management metadata for the one or more display images.

In an embodiment, the image processing pipeline is further configured to cause one or more downstream devices to receive the set of display management metadata with the one or more display images.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

12. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
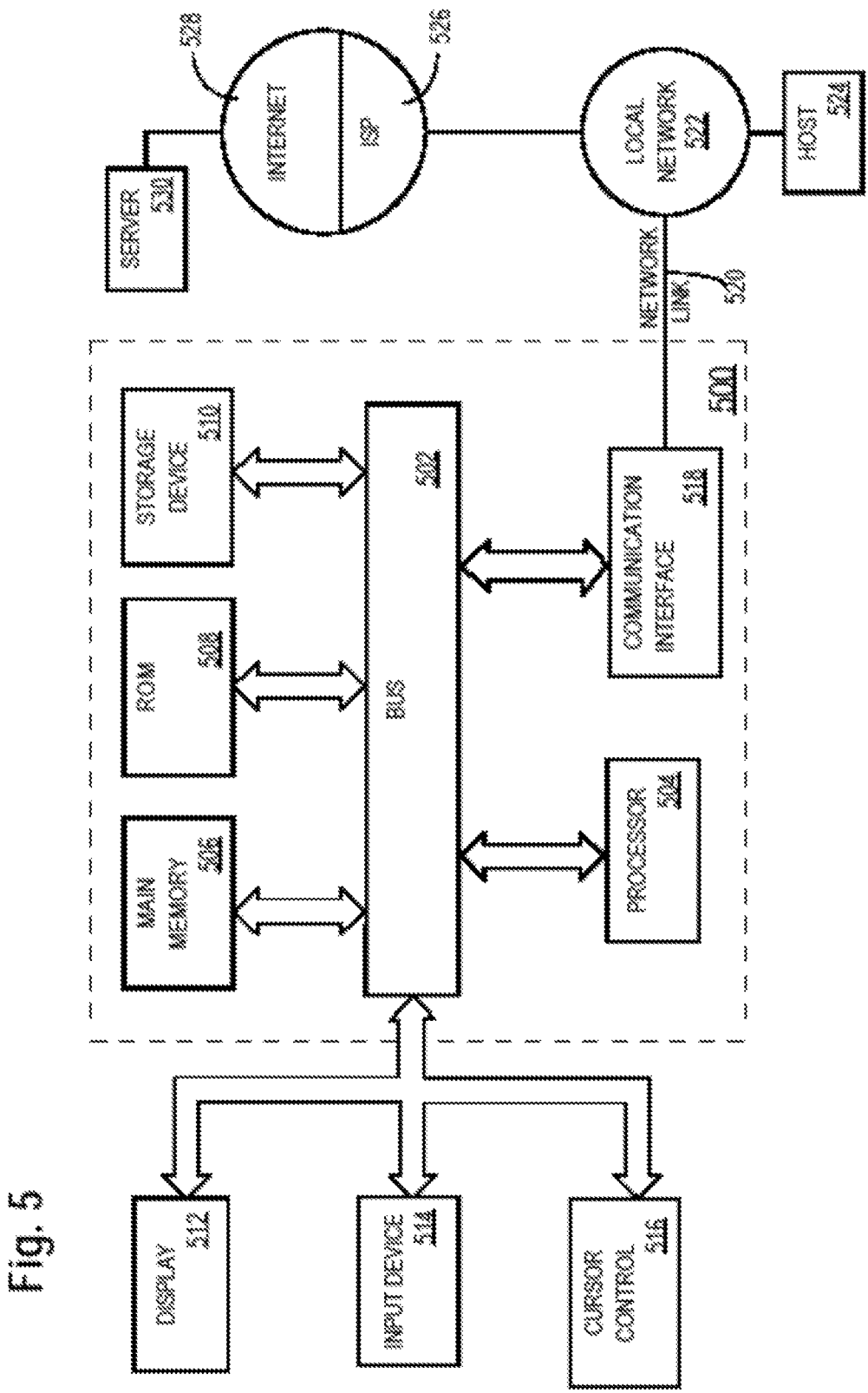
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used instead of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

13. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1

A method, comprising:
capturing one or more input scene images from an original scene, the one or more input scene images being represented in an input color space;
converting the one or more input scene images into one or more color-space-converted scene images in one of an LMS color space or an ICtCp color space;
mapping, based at least in part on an optical transfer function, scene light levels represented in the one or more color-space-converted scene images in the one of the LMS color space or the ICtCp color space to mapped light levels;
applying a tone mapping to the mapped light levels to generate corresponding display light levels to be represented in one or more display images;
causing the one or more display images to be rendered on a target display.

EEE 2

The method of EEE 1, wherein the optical transfer function represents a mapping curve derived by adjusting a reference optical transfer function with a surround compensation based on a scene viewing environment of the original scene that is different from a reference scene viewing environment associated with the reference transfer function.

EEE 3

The method of EEE 1, wherein the optical transfer function represents a reference optical transfer function associated with a reference scene viewing environment that is different from a scene viewing environment of the original scene; further comprising applying a surround compensation in mapping scene light levels represented in the one or more color-space-converted scene images to mapped light levels in addition to applying the optical transfer function.

EEE 4

The method of any of EEEs 1-3, wherein the tone mapping represents a reference tone mapping curve associated with a reference display viewing environment that is different from an actual display viewing environment of the target display; further comprising applying an ambient light adjustment in applying the tone mapping to the mapped light levels to generate the corresponding display light levels to be represented in one or more display images.

EEE 5

The method of any of EEEs 1-4, wherein the optical transfer function represents one of an optical-to-optical transfer function (OOTF), an optical-to-electric transfer function (OETF), an inverse electric-to-optical transfer function (inverse EOTF), or another optical transfer function.

EEE 6

A method, comprising:
converting a set of scene pixel values for a scene pixel in a scene image captured from an original scene into a set of L, M and S scene pixel values represented in an LMS color space for the scene pixel, the set of scene pixel values being represented in an input color space;
deriving a scene light level for the scene pixel based on the set of L, M and S scene pixel values for the scene pixel;
mapping, based at least in part on an optical transfer function, the scene light level to a mapped light level of the scene pixel;
applying a common ratio to each of the L, M and S scene pixel values in the set of L, M and S scene pixel values for the scene pixel to generate a set of mapped L, M and S scene pixel values for the scene pixel, the common ratio being computed from the scene light level and the mapped light level;
causing a display image to be rendered on a target display, the display image including a display pixel for which a set of display pixel values is derived from the set of mapped L, M and S scene pixel values.

EEE 7

The method of EEE 6, wherein the scene image comprises a plurality of sets of scene pixel values for a plurality of scene pixels of the scene image, wherein each set of scene pixel values in the plurality of sets of scene pixel values corresponds to a respective scene pixel in the plurality of scene pixels; and further comprising repeating the method of EEE 6 for each set of scene pixel values in the plurality of sets of scene pixel values to generate a plurality of sets of display pixel values to be included in the display image.

EEE 8

A method, comprising:
converting a set of scene pixel values for a scene pixel in a scene image captured from an original scene into a set of I, T and P scene pixel values represented in an ICtCp color space for the scene pixel, the set of scene pixel values being represented in an input color space;
mapping, based at least in part on an optical transfer function, an I scene pixel value in the set of I, T and P scene pixel values to a mapped I scene pixel value;
causing a display image to be rendered on a target display, the display image including a display pixel for which a set of display pixel values is derived from a set of (a) the mapped I scene pixel value, and (b) T and P scene pixel values in the set of mapped I, T and P scene pixel values for the scene pixel.

EEE 9

The method of EEE 8, wherein the scene image comprises a plurality of sets of scene pixel values for a plurality of scene pixels of the scene image, wherein each set of scene pixel values in the plurality of sets of scene pixel values corresponds to a respective scene pixel in the plurality of scene pixels; and further comprising repeating the method of EEE 7 for each set of scene pixel values in the plurality of sets of scene pixel values to generate a plurality of sets of display pixel values to be included in the display image.

EEE 10

A method, comprising:
generating a scene environment light level to represent a scene viewing environment of an original scene from which one or more scene images are captured;
generating a range of scene light levels represented in the one or more scene images of the original scene;
determining whether the scene environment light level is same as a display environment light level that represents a display viewing environment of a target display;
determining whether the range of scene light levels is within a supported range of display light levels supported by the target display;

in response to determining that the scene environment light level is same as a display environment light level that represents a display viewing environment of a target display and that the range of scene light levels is within a supported range of display light levels supported by the target display, generating one or more display images comprising display light levels that are identical to corresponding scene light levels in the one or more scene images;
causing the one or more display images to be rendered on the target display.

EEE 11

The method of EEE 10, further comprising:
in response to determining that the scene environment light level is not same as the display environment light level or that the range of scene light levels is not within a supported range of display light levels supported by the target display, mapping, based at least in part on an optical transfer function, the scene light levels to mapped light levels, the mapped light levels being used to derive the display light levels to be represented in the one or more display images.

EEE 12

The method of EEE 11, wherein the optical transfer function is derived by interpolation of two fixed optical transfer functions based on an interpolation factor that is dependent on the scene environment light level.

EEE 13

The method of EEE 11, wherein the optical transfer function is selected from among a plurality of optical transfer functions based on the scene environment light level, and wherein the plurality of optical transfer functions corresponds to a plurality of different possible scene environment light levels.

EEE 14

The method of EEE 11, wherein the optical transfer function represents a reference optical transfer function associated with a reference scene viewing environment that is different from the scene viewing environment of the original scene; further comprising applying, based on the scene viewing environment of the original scene, a surround compensation in mapping the scene light levels to the mapped light levels in addition to applying the optical transfer function.

EEE 15

The method of EEE 11, wherein the optical transfer function represents a reference optical transfer function associated with a reference scene viewing environment that is different from the scene viewing environment of the original scene; further comprising applying a tone mapping to the mapped light levels to generate the display light levels to be represented in the one or more display images in addition to applying the optical transfer function.

EEE 16

The method of EEE 15, wherein the tone mapping represents a reference tone mapping associated with a reference display viewing environment that is different from an actual display viewing environment of the target display; further comprising applying an ambient light adjustment in applying the tone mapping to the mapped light levels to generate the display light levels to be represented in one or more display images.

EEE 17

A method, comprising:
generating a scene environment light level to represent a scene viewing environment of an original scene from which one or more scene images are captured;
generating a range of scene light levels represented in the one or more scene images of the original scene;
applying a tone mapping to scene pixel values in the one or more scene images of the original scene to generate corresponding display pixel values in one or more display images;
causing the one or more display images to be rendered on the target display.

EEE 18

The method of EEE 17, wherein the tone mapping supplants optical-to-optical transfer-function (OOTF) based light level mapping.

EEE 19

The method of EEE 17, wherein the tone mapping is selected from among a plurality of tone mappings based on the scene environment light level, and wherein the plurality of tone mappings corresponds to a plurality of different possible scene environment light levels.

EEE 20

The method of EEE 17, wherein the tone mapping represents a reference tone mapping associated with an assumed scene viewing environment that is different from the scene viewing environment of the original scene; further comprising applying, based on the scene viewing environment of the original scene, a surround compensation in mapping the scene light levels to the mapped light levels in addition to applying the tone mapping.

EEE 21

The method of EEE 17, wherein the tone mapping represents a reference tone mapping associated with a reference display viewing environment that is different from an actual display viewing environment of the target display; further comprising applying an ambient light adjustment in applying the tone mapping to the mapped light levels to generate the display light levels to be represented in one or more display images.

EEE 22

The method of any of EEEs 17-21, wherein the one or more display images are a part of a time sequence of display images, and wherein the time sequence of display images is encoded in one or more of: video streams or video files.

EEE 23

The method of any of EEEs 17-22, further comprising applying one or more camera image signal processing (ISP) operations on the one or more scene images before one or more display management (DM) operations.

EEE 24

The method of any of EEEs 17-23, further comprising applying one or more camera image signal processing (ISP) operations on the one or more scene images after one or more display management (DM) operations.

EEE 25

The method of any of EEEs 17-24, further comprising generating a set of display management metadata for the one or more display images.

EEE 26

The method of EEE 25, further comprising causing one or more downstream devices to receive the set of display management metadata with the one or more display images.

EEE 27

An apparatus performing any of the methods as recited in EEEs 1-26.

EEE 28

A system performing any of the methods as recited in EEEs 1-26.

EEE 29

A non-transitory computer readable storage medium, storing software instructions, which when executed by one or more processors cause performance of the method recited in any of EEEs 1-26.

EEE 30

A computing device comprising one or more processors and one or more storage media, storing a set of instructions, which when executed by one or more processors cause performance of the method recited in any of EEEs 1-26.

What is claimed is:

1. A method, comprising:
converting a set of scene pixel values for a scene pixel in a scene image captured from an original scene into a set of I, T and P scene pixel values represented in an ICtCp color space for the scene pixel, the set of scene pixel values being represented in an input color space;
mapping, based on an optical-to-optical transfer function (OOTF), a I scene pixel value in the set of I, T and P scene pixel values to a mapped I scene pixel value; and
generating a display image including a display pixel for which a set of display pixel values includes the mapped I scene pixel value.

2. The method of claim 1, wherein mapping the I scene pixel value to a
mapped I scene pixel value comprises:
converting the I scene pixel value to a linear pixel value using a Perceptual Quantization (PQ) to linear conversion function;
optionally scaling the linear pixel value;
applying the OOTF to the linear pixel value to obtain a mapped linear pixel value; and
converting the mapped linear pixel value to the mapped I scene pixel value using a linear to PQ conversion function.

3. The method of claim 1, comprising mapping a T scene pixel value and a P scene pixel value in the set of I, T and P scene pixel values for the scene pixel to a mapped T scene pixel value and a mapped P scene pixel value, respectively, by multiplying the respective scene pixel value with a saturation adjustment factor, the saturation adjustment factor being computed from the I scene pixel value and the mapped I scene pixel value.

4. The method of claim 3, wherein computing the saturation adjustment factor comprises at least one of:
calculating a difference between the mapped I scene pixel value and the I scene pixel value; and
calculating a ratio of the mapped I scene pixel value to the I scene pixel value.

5. A method as recited in claim 1, wherein the scene image comprises a plurality of sets of scene pixel values for a plurality of scene pixels of the scene image, wherein each set of scene pixel values in the plurality of sets of scene pixel values corresponds to a respective scene pixel in the plurality of scene pixels; and further comprising repeating the steps of claim 1 for each set of scene pixel values in the plurality of sets of scene pixel values to generate a plurality of sets of display pixel values to be included in the display image.

6. A method as recited in claim 1, further comprising: applying a tone mapping to generate the display image.

7. A method as recited in claim 6, wherein the tone mapping is performed on a mapped image generated by applying the OOTF to the scene image.

8. A method as recited in claim 6, wherein the display image is generated for display on a target display, and wherein the tone mapping represents a reference tone mapping curve associated with a reference display viewing environment that is different from an actual display viewing environment of the target display; further comprising applying an ambient light adjustment.

9. A method as recited in claim 1, wherein the OOTF corresponds to the reference PQ OOTF defined in Rec. ITU-R BT.2100.

10. A method as recited in claim 1, wherein the OOTF represents a mapping curve derived by adjusting a reference OOTF with a surround compensation based on a scene viewing environment of the original scene that is different from a reference scene viewing environment associated with the reference OOTF.

11. A method as recited in claim 10, wherein the reference OOTF corresponds to the reference PQ OOTF defined in Rec. ITU-R BT.2100.

12. A method as recited in claim 1, wherein the OOTF represents a reference OOTF associated with a reference scene viewing environment that is different from a scene viewing environment of the original scene; further comprising applying a surround compensation in addition to applying the OOTF.

13. A method as recited in claim 1, wherein the OOTF is derived by interpolation of two fixed OOTFs based on an interpolation factor that is dependent on a scene environment light level of the original scene.

14. A method as recited in claim 13, wherein the two fixed OOTFs or the plurality of OOTFs, respectively, are obtained by applying surround compensation to the reference PQ OOTF defined in Rec. ITU-R BT.2100.

15. A method as recited in claim 1, wherein the OOTF is selected from among a plurality of OOTFs based on a scene environment light level of the original scene, and wherein the plurality of OOTFs corresponds to a plurality of different possible scene environment light levels.

16. A system comprising one or more apparatus, the system configured to perform the method as recited in claim 1.

17. A tangible, non-transitory computer program product, having instructions which, which when executed by one or more processors cause said one or more processors to perform the method recited in claim 1.

18. A method, comprising:
converting a set of scene pixel values for a scene pixel in a scene image captured from an original scene into a set of L, M and S scene pixel values represented in an LMS color space for the scene pixel, the set of scene pixel values being represented in an input color space;
deriving a scene light level I for the scene pixel based on the set of L, M and S scene pixel values for the scene pixel as
I=(L+M)/2;
mapping, based on an optical-to-optical transfer function (OOTF), the scene light level I to a mapped light level of the scene pixel as OOTF(I);
generating a set of mapped L, M, and S scene pixel values for the scene pixel as
L'=L*OOTF(I)/I, M'=M*OOTF(I)/I, and S'=S*OOTF(I)/I; and
generating a display image including a display pixel for which a set of display pixel values is derived from the set of mapped L, M and S scene pixel values.

19. A method as recited in claim 18, wherein the scene image comprises a plurality of sets of scene pixel values for a plurality of scene pixels of the scene image, wherein each set of scene pixel values in the plurality of sets of scene pixel values corresponds to a respective scene pixel in the plurality of scene pixels; and further comprising repeating the steps of claim 18 for each set of scene pixel values in the plurality of sets of scene pixel values to generate a plurality of sets of display pixel values to be included in the display image.

\* \* \* \* \*